United States Patent
Surla et al.

(10) Patent No.: US 10,764,045 B2
(45) Date of Patent: Sep. 1, 2020

(54) ENCRYPTING OBJECT INDEX IN A DISTRIBUTED STORAGE ENVIRONMENT

(71) Applicant: Microsoft Technology Licensing, LLC, Redmond, WA (US)

(72) Inventors: Rushi Srinivas Surla, Kenmore, WA (US); Shane Kumar Mainali, Duvall, WA (US); Andrew Edwards, Bellevue, WA (US); Maneesh Sah, Sammamish, WA (US); Weiping Zhang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 162 days.

(21) Appl. No.: 15/638,831

(22) Filed: Jun. 30, 2017

(65) Prior Publication Data
US 2019/0007206 A1    Jan. 3, 2019

(51) Int. Cl.
*G06F 16/18*    (2019.01)
*H04L 9/08*    (2006.01)
(Continued)

(52) U.S. Cl.
CPC ............ *H04L 9/0891* (2013.01); *G06F 3/062* (2013.01); *G06F 3/067* (2013.01); *G06F 3/0608* (2013.01);
(Continued)

(58) Field of Classification Search
CPC ...... G06F 9/5083; G06F 16/10; G06F 16/128; G06F 16/13; G06F 16/134; G06F 16/164;
(Continued)

(56) References Cited

U.S. PATENT DOCUMENTS 5,604,902 A    2/1997  Burkes et al.
5,696,927 A *  12/1997  MacDonald .......... G06F 12/023
                                                    710/68
(Continued)

OTHER PUBLICATIONS

Calder et al. "Windows Azure Storage: A Highly Available Cloud Storage Service with Strong Consistency" [Online], Oct. 26, 2001 [Retrieved on: Feb. 27, 2019] SOSP 2011 pp. 143-157, Retrieved from: < https://dl.acm.org/citation.cfm?id=2043571 > (Year: 2011).*

(Continued)

*Primary Examiner* — Eric W Shepperd
(74) *Attorney, Agent, or Firm* — Alleman Hall Creasman & Tuttle LLP

(57) ABSTRACT

A system receives data of one or more types from one or more sources having distinct identities for storing the data in a distributed storage system. The system stores metadata associated with storing the data in data structures in the distributed storage system. The system selects a portion of the data and a portion of the metadata associated with storing the data in the distributed storage system. The system compresses the selected portions of the data and the metadata, encrypts the compressed data and metadata using a single key or using a separate key for each data type, and stores the encrypted compressed data and metadata in the distributed storage system. The system also encrypts unencrypted metadata and associated data during defragmentation procedure.

16 Claims, 19 Drawing Sheets

(51) Int. Cl.
  *H04L 9/14* (2006.01)
  *G06F 3/06* (2006.01)
  *H04L 29/06* (2006.01)
  *H04L 29/14* (2006.01)
  *H04L 29/08* (2006.01)

(52) U.S. Cl.
  CPC .......... *G06F 3/0623* (2013.01); *G06F 3/0661* (2013.01); *H04L 9/0822* (2013.01); *H04L 9/0894* (2013.01); *H04L 9/14* (2013.01); *H04L 63/0428* (2013.01); *H04L 63/10* (2013.01); *H04L 67/10* (2013.01); *H04L 67/1097* (2013.01); *H04L 67/18* (2013.01); *H04L 67/2823* (2013.01); *H04L 69/04* (2013.01); *H04L 69/40* (2013.01); *H04L 2209/30* (2013.01)

(58) Field of Classification Search
  CPC ............... G06F 16/172; G06F 16/1724; G06F 16/1744; G06F 16/1805; G06F 16/1815; G06F 21/60; G06F 21/62; G06F 21/6218; G06F 21/6227
  See application file for complete search history.

(56) References Cited

U.S. PATENT DOCUMENTS

| | | | |
|---|---|---|---|
| 8,130,554 B1 | 3/2012 | Linnell | |
| 8,195,614 B2 | 6/2012 | Patterson | |
| 8,341,339 B1 | 12/2012 | Boyle et al. | |
| 8,620,884 B2* | 12/2013 | Calder | G06F 16/2255 707/696 |
| 8,930,691 B2 | 1/2015 | Kamara et al. | |
| 9,021,163 B1 | 4/2015 | Czarny et al. | |
| 9,077,541 B2 | 7/2015 | Osterwalder et al. | |
| 9,270,459 B2 | 2/2016 | Mukkara et al. | |
| 9,298,942 B1 | 3/2016 | Millikin | |
| 9,317,714 B2 | 4/2016 | Kopasz et al. | |
| 9,330,245 B2 | 5/2016 | Maron | |
| 9,396,341 B1 | 7/2016 | Chandra et al. | |
| 9,455,963 B1 | 9/2016 | Roth et al. | |
| 10,146,479 B1* | 12/2018 | Tolstoy | G06F 3/0686 |
| 10,241,870 B1* | 3/2019 | Beatty | G06F 11/1451 |
| 10,515,701 B1 | 12/2019 | Aster et al. | |
| 2002/0087823 A1* | 7/2002 | Chow | G06F 3/0611 711/170 |
| 2004/0102987 A1* | 5/2004 | Takahashi | G06F 21/10 705/59 |
| 2006/0150190 A1* | 7/2006 | Gusler | G06F 9/5011 718/105 |
| 2006/0153374 A1* | 7/2006 | Shahindoust | H04L 9/0662 380/44 |
| 2006/0173794 A1* | 8/2006 | Sellars | G06F 21/10 705/76 |
| 2010/0030690 A1 | 2/2010 | Herlitz | |
| 2010/0250864 A1* | 9/2010 | Carty | G06F 9/445 711/147 |
| 2010/0306283 A1* | 12/2010 | Johnson | G06F 16/125 707/803 |
| 2011/0211689 A1 | 9/2011 | von mueller et al. | |
| 2011/0271067 A1* | 11/2011 | Chou | G06F 11/1448 711/162 |
| 2012/0036366 A1 | 2/2012 | May et al. | |
| 2013/0198529 A1* | 8/2013 | Fuhr | B01L 1/50 713/189 |
| 2013/0263289 A1* | 10/2013 | Vijayan | G06F 21/60 726/31 |
| 2013/0282955 A1 | 10/2013 | Parker et al. | |
| 2013/0318526 A1 | 11/2013 | Conrad et al. | |
| 2014/0082029 A1 | 3/2014 | Burka et al. | |
| 2014/0181041 A1* | 6/2014 | Whitehead | G06F 11/1448 707/652 |
| 2014/0297987 A1* | 10/2014 | Garson | G06F 12/023 711/170 |
| 2014/0372752 A1 | 12/2014 | Sallis | |
| 2015/0155936 A1 | 6/2015 | Liu et al. | |
| 2015/0172260 A1 | 6/2015 | Brenner | |
| 2015/0347320 A1 | 12/2015 | Spillane et al. | |
| 2016/0034713 A1 | 2/2016 | Ramirez | |
| 2016/0044000 A1* | 2/2016 | Cunningham | H04L 9/14 713/175 |
| 2016/0119294 A1 | 4/2016 | Petach et al. | |
| 2016/0150047 A1 | 5/2016 | O'hare et al. | |
| 2016/0173599 A1* | 6/2016 | Chablani | H04L 67/1097 709/217 |
| 2016/0218875 A1* | 7/2016 | Le Saint | H04L 9/0822 |
| 2017/0364704 A1* | 12/2017 | Wright | G06F 21/6227 |
| 2018/0004868 A1 | 1/2018 | Adam et al. | |
| 2018/0034787 A1* | 2/2018 | Kamaraju | H04L 63/0464 |
| 2018/0196745 A1 | 7/2018 | Karr et al. | |
| 2018/0253559 A1* | 9/2018 | Satpathy | G06F 3/0683 |
| 2018/0307435 A1* | 10/2018 | van Riel | G06F 3/0647 |
| 2018/0322136 A1* | 11/2018 | Carpentier | G06F 16/168 |
| 2019/0005262 A1 | 1/2019 | Surla et al. | |
| 2019/0007208 A1 | 1/2019 | Surla et al. | |
| 2019/0354713 A1 | 11/2019 | Surla et al. | |

OTHER PUBLICATIONS

HashiCorp, "Key Rotation" [Online] Aug. 18, 2015 [Retrieved on: Mar. 13, 2019], web.archive.org, Retrieved from: < https://web.archive.org/web/20150818164801/https://www.vaultproject.io/docs/internals/rotation.html > (Year: 2015).*

Peterson, et al., "Category 8 // Encryption", https://downloads.cloudsecurityalliance.org/initiatives/secaas/SecaaS_Cat_8_Encryption_Implementation_Guidance.pdf, Published on: Sep. 2012, 1-28 pages.

"Non Final Office Action Issued in U.S. Appl. No. 15/638,434", dated Dec. 14, 2018, 8 Pages.

"Non-Final Office Action Issued in U.S. Appl. No. 15/638,746", dated Feb. 25, 2019, 12 Pages.

"Final Office Action Issued in U.S. Appl. No. 15/638,746", dated Sep. 5, 2019, 14 Pages.

"Notice of Allowance Issued in U.S. Appl. No. 15/638,746", dated Jan. 23, 2020, 16 Pages.

"Non Final Office Action Issued in U.S. Appl. No. 16/529,019", dated Jun. 12, 2020, 9 Pages.

* cited by examiner

ENCRYPTING OBJECT INDEX IN A DISTRIBUTED STORAGE ENVIRONMENT

FIELD

The present disclosure relates generally to distributed storage systems and more particularly to encrypting system metadata associated with storing various types of data for multiple customers in a distributed storage system.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Data is often encrypted for security reasons. However, encrypting large amounts of data generally increases the latency that is normally associated with encrypting and storing the data. Additionally, managing keys used for encryption and decryption can be a complex undertaking when data for multiple users is stored in a distributed storage environment. Further, selecting which data to encrypt, when and where to encrypt the selected data, and managing encrypted and unencrypted data can be challenging tasks.

SUMMARY

A system comprises a processor and machine readable instructions stored on a tangible machine readable medium, which when executed by the processor, configure the processor to receive requests to store data in a distributed storage system implemented in a cloud computing system. The requests are received at a first layer of servers in the distributed storage system. The first layer of servers is configured to authenticate and authorize the requests. The machine readable instructions further configure the processor to send the requests and data associated with the requests upon authentication and authorization of the requests to a second layer of servers in the distributed storage system. The second layer of servers is configured to store data structures that include metadata associated with storing the data in a third layer of servers in the distributed storage system. The machine readable instructions further configure the processor to compress the metadata associated with storing the data in the third layer of servers in the distributed storage system, encrypt the compressed metadata, and store the encrypted compressed metadata in the third layer of servers in the distributed storage system.

In other features, the machine readable instructions configure the processor to compress at least a portion of the data when compressing the metadata, encrypt the compressed portion of the data when encrypting the compressed metadata, and store the encrypted compressed portion of the data with the encrypted compressed metadata in the third layer of servers in the distributed storage system.

In other features, the machine readable instructions configure the processor to generate the metadata associated with storing the data in the third layer of servers in the distributed storage system, and store the metadata in the data structures in the second layer of servers in the distributed storage system.

In other features, the data includes different types of data, and the metadata includes different metadata for each type of data.

In other features, the data includes data from different sources having different identities that the first layer of servers is configured to authenticate and authorize.

In other features, the data includes different types of data from different sources having different identities, and the machine readable instructions configure the processor to encrypt the metadata associated with the data of the different types from the different sources using a single key.

In other features, the data includes different types of data from different sources having different identities, and the machine readable instructions configure the processor to encrypt the metadata associated with the data from the different sources using a separate key for each type of data.

In other features, the machine readable instructions configure the processor to collect the metadata and at least a portion of the data for a plurality of the requests prior to compressing and encrypting the metadata and the portion of the data.

In other features, the machine readable instructions configure the processor to encrypt each data unit of the compressed metadata using a separate seed randomly generated for each data unit so that consecutive encrypted data units appear random.

In other features, the machine readable instructions configure the processor to store a seed used to encrypt a data unit of the compressed metadata in unencrypted form in a header associated with the encrypted data unit and to use the seed stored in the header associated with the encrypted data unit when decrypting the encrypted data unit.

In other features, the machine readable instructions configure the processor to encrypt a first key used to encrypt the compressed metadata using a second key associated with a cluster comprising the first, second, and third layers of servers; and rotate the second key.

In other features, the machine readable instructions configure the processor to accumulate portions of the metadata in the data structures in memory in the second layer of servers in the distributed storage system. The machine readable instructions further configure the processor to generate new data structures based on the data structures in the memory when a predetermined criterion regarding the data structures in the memory is met. The machine readable instructions further configure the processor to compress the portions of the metadata accumulated in the data structures in the memory when generating the new data structures, encrypt the compressed portions of the metadata when generating the new data structures, and store the new data structures including the encrypted compressed portions of the metadata in a disk in the third layer of servers in the distributed storage system.

In other features, the machine readable instructions configure the processor to accumulate and compress the data associated with the portions of the metadata when compressing the portions of the metadata. The machine readable instructions further configure the processor to encrypt the compressed data when encrypting the compressed portions of the metadata. The machine readable instructions further configure the processor to store the encrypted compressed data with the encrypted compressed portions of the metadata in the new data structures in the third layer of servers in the distributed storage system. The machine readable instructions further configure the processor to update the metadata to point to the new data structures in the third layer of servers in the distributed storage system.

In other features, the machine readable instructions configure the processor to defragment data units storing unencrypted metadata and associated data in the third layer of servers in the distributed storage system, and compress and encrypt the unencrypted metadata and associated data while defragmenting the data units.

In other features, the machine readable instructions configure the processor to select data units storing unencrypted metadata and associated data in the third layer of servers in the distributed storage system based on at least one of an age and an amount of the unencrypted metadata and associated data stored in the data units. The machine readable instructions further configure the processor to determine which of the selected data units include valid data based on a predetermined criterion, the valid data including valid unencrypted metadata and associated data. The machine readable instructions further configure the processor to defragment the data units with valid data by writing the valid data from the data units to one or more new data units in the third layer of servers in the distributed storage system and by releasing the data units for storing new data. The machine readable instructions further configure the processor to compress and encrypt the valid data when writing the valid data to the one or more new data units. The machine readable instructions further configure the processor to update the metadata to point to the one or more new data units.

In still other features, a method comprises accumulating, in first data structures in a first storage medium in a distributed storage system, data and metadata associated with storing the data in the distributed storage system, the data received from a plurality of sources having distinct identities, and the data being of different types. The method further comprises converting the first data structures, after a predetermined criterion is satisfied, into second data structures for storing in a second storage medium in the distributed storage system. The method further comprises compressing and encrypting the accumulated metadata and the data when converting the first data structures into the second data structures. The method further comprises storing the second data structures including the compressed and encrypted metadata and data in the second storage medium in the distributed storage system.

In other features, the method further comprises encrypting the metadata associated with the data of the different types from the plurality of sources using a single key, or encrypting the metadata associated with the data from the plurality of sources using a separate key for each type of data.

In other features, the method further comprises encrypting each data unit of the compressed metadata using a separate seed randomly generated for each data unit so that consecutive encrypted data units appear random. The method further comprises storing a seed used to encrypt a data unit of the compressed metadata in unencrypted form in a header associated with the encrypted data unit. The method further comprises using the seed stored in the header associated with the encrypted data unit when decrypting the encrypted data unit.

In other features, the method further comprises defragmenting data units storing unencrypted metadata and associated data in the distributed storage system, and compressing and encrypting the unencrypted metadata and associated data while defragmenting the data units.

In still other features, a system comprises a processor and machine readable instructions stored on a tangible machine readable medium, which when executed by the processor, configure the processor to receive data of one or more types from one or more sources having distinct identities for storing the data in a distributed storage system. The machine readable instructions further configure the processor to store metadata associated with storing the data in data structures in the distributed storage system. The machine readable instructions further configure the processor to select a portion of the metadata associated with storing the data in the distributed storage system. The machine readable instructions further configure the processor to compress the selected portion of the metadata, encrypt the compressed metadata using a single key or using a separate key for each data type, and store the encrypted compressed metadata in the distributed storage system.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 17 shows a first method for encrypting unencrypted data while rewriting data during garbage collection in a distributed storage environment such as the cloud storage system of FIG. 6 when encryption is turned on.

FIG. 18 shows a second method for encrypting unencrypted data while rewriting data during garbage collection in a distributed storage environment such as the cloud storage system of FIG. 6 regardless of whether encryption is turned on.

In the drawings, reference numbers may be reused to identify similar and/or identical elements.

DETAILED DESCRIPTION

Figure 1:
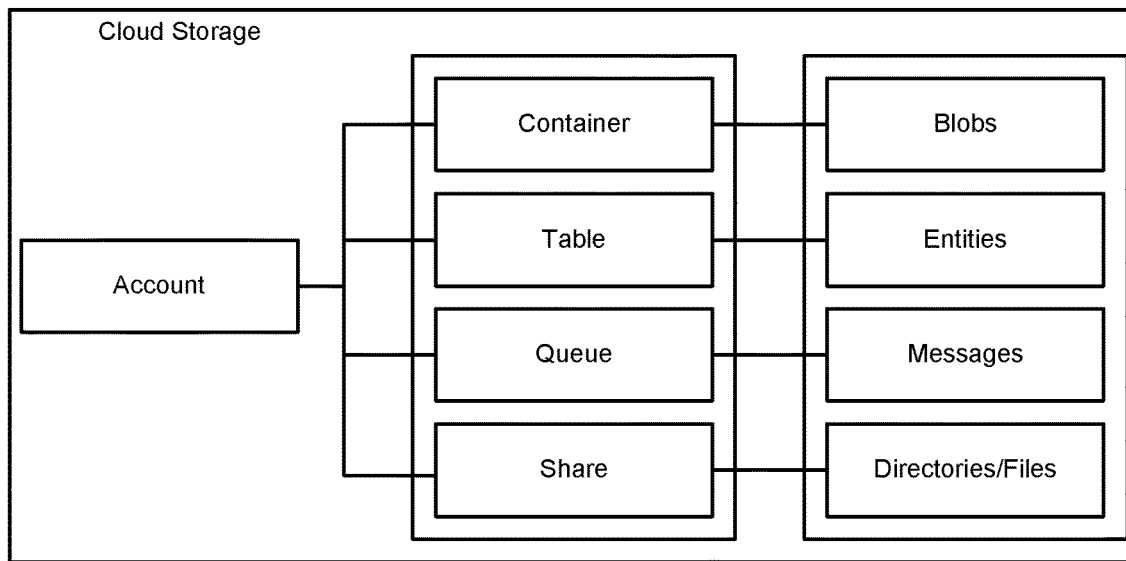
FIG. 1 shows relationships between cloud storage resources in a storage account.

The present disclosure proposes systems and methods for encrypting system metadata (defined below) associated with data stored in a distributed storage system. The data can be of various types and from various user accounts having distinct identities. The systems and methods use batching, compressing, and encrypting methods when live user requests are received for storing data in a distributed storage system, as explained below in detail (e.g., with reference to checkpoint process). Accordingly, the encryption process takes place in the background without impacting user requests. Further, the present disclosure proposes systems and methods for encrypting existing unencrypted system metadata using age based garbage collection. The system metadata is internal to the distributed storage system. Therefore, an internally generated key can be used for encrypting the system metadata associated with different types of data from different user accounts since the encryption is transparent to the accounts. In addition to encrypting the system metadata, the systems and methods also encrypt data for some data types as explained below. Further, before encrypting, the systems and methods also compress the system metadata and the data for some data types. The systems and methods provide significant capacity savings and security for data from various user accounts stored across the distributed storage system while minimizing latency due to encryption since the encryption is performed in the background. These and other features of the systems and methods are described below in detail.

Some encryption systems used in distributed storage environments such as cloud storage systems may compress and encrypt large amounts of data upfront at a front end layer of the distributed storage environment as described below. Compressing and encrypting data upfront reduces the latency that is normally associated with encrypting and storing the data. Additionally, compressing and encrypting data upfront reduces latencies normally associated with data transfers that occur downstream in the distributed storage environment as well as data transfers that occur across clusters and data centers.

Further, some encryption systems may allow users to turn encryption on and off dynamically and to track encryption status of the data. The ability to dynamically turn encryption on and off creates situations where a user may have large amounts of unencrypted data before the user turns on encryption for the first time. The user may also have unencrypted data after the user turns off encryption. The user may want to encrypt such unencrypted data.

Furthermore, some systems and methods may encrypt data that remains unencrypted due to the ability to dynamically turn encryption on and off. The systems and methods can also encrypt unencrypted data regardless of whether the user turns on encryption at all. These systems and methods encrypt existing live unencrypted data using age based garbage collection. Specifically, the systems and methods opportunistically use the rewrite phase of the age based garbage collection (i.e., defragmentation) process to encrypt the unencrypted data. For example, the garbage collection process encrypts the unencrypted data while rewriting data collected from one storage region to another. Essentially, these systems and methods piggyback encryption on the age based garbage collection process, which eliminates the need to separately process and encrypt the unencrypted data by expending additional compute and other resources. Thus, encrypting unencrypted data during garbage collection saves compute resources as well as results in network/bandwidth savings.

Further, garbage collection runs in the background transparently to the user. For example, garbage collection runs while the user is normally accessing the data. Accordingly, encrypting while defragmenting also runs in the background transparently to the user. The user normally accesses the data while the data is being encrypted during garbage collection.

Accordingly, as described below in detail, these systems and methods encrypt existing object index and data for different data types Blobs, Tables, Queues, Server Message Block (SMB) Files. The different data types share a common indexing layer which utilizes an append-only log for durability, log-structured merge tree for efficient indexing, and a blob data layer for object data. The cloud storage system encrypts the index and object data and swaps out the unencrypted index and object data with the encrypted version live with no downtime. This is done using age-based garbage collection. There is no downtime to the user requests due to the manner in which data and index are updated in the garbage collection process. These and other features of the systems and methods for encrypting existing live unencrypted data using the age based garbage collection are described below in detail.

The present disclosure is organized as follows. First, types of data handled by the present disclosure are explained with reference to FIGS. 1-2. Then a cloud computing system is presented as an example of a distributed storage environment with reference to FIGS. 3-5. Then the architecture of a distributed storage system is explained in detail with reference to FIGS. 6-10. Thereafter, methods of compressing and encrypting data in the distributed storage environment are described with reference to FIGS. 11-16. Thereafter, methods for encrypting unencrypted data while rewriting data during garbage collection are described with reference to FIGS. 17-18. Thereafter, methods for encrypting system metadata and encrypting existing unencrypted metadata while defragmenting are described with reference to FIGS. 19-23. Thereafter, a simplified example of a distributed network system is described with reference to FIGS. 24-26, which can implement the cloud computing system shown in FIGS. 3-5, and which can implement the methods for compressing and encrypting data and system metadata shown in FIGS. 11-23.

Cloud computing enables new scenarios for applications requiring scalable, durable, and highly available storage for their data. Cloud storage is accessible from anywhere in the world, from any type of application, whether running in the cloud, on a desktop, on an on-premises server, or on a mobile or tablet device. Cloud storage exposes data resources via simple Representational State Transfer (REST) Application Programming Interfaces (APIs), which are available to any client capable of sending and receiving data via Hypertext Transfer Protocol/Secure (HTTP/HTTPS).

Cloud storage provides the following four services: Blob storage, Table storage, Queue storage, and File storage. Blob Storage stores unstructured object data. A blob (i.e., a binary large object) can be any type of text or binary data, such as a document, media file, or application installer. Blob storage is also referred to as Object storage. Table Storage stores structured datasets. Table storage is a not only Structured Query Language (NoSQL) key-attribute data store, which allows for rapid development and fast access to large quantities of data. Queue Storage provides reliable messaging for workflow processing and for communication between components of cloud services. File Storage offers shared storage for legacy applications using the standard Server Message Block (SMB) protocol. Virtual machines (VMs) and cloud services can share file data across application components via mounted shares, and on-premises applications can access file data in a share via the file service REST API.

FIG. 1 shows relationships between cloud storage resources in a storage account. A storage account is a secure account that gives customers access to services in cloud storage 2. A storage account provides a unique namespace for a customer's storage resources. Storage accounts can be of two types: general-purpose storage accounts and Blob storage accounts. A general-purpose storage account gives customers access to cloud storage services such as Tables, Queues, Files, Blobs and virtual machine disks under a single account. A Blob storage account is a specialized storage account for storing unstructured data as blobs (objects) in the cloud storage 2.

Blob storage is useful for users with large amounts of unstructured object data to store in the cloud. Customers can use Blob storage to store content such as documents; social data such as photos, videos, music, and blogs; backups of files, databases, computers, and devices; images and text for web applications; configuration data for cloud applications; and Big data, such as logs and other large datasets. Every blob is organized into a container. Containers also provide a useful way to assign security policies to groups of objects. A storage account can contain any number of containers, and a container can contain any number of blobs, up to a capacity limit of the storage account.

Table storage is NoSQL key/attribute store with a schema-less design, making it different from traditional relational databases. With a schema-less data store, it is easy to adapt data as the needs of an application evolve. Table storage is a key-attribute store, meaning that every value in a table is stored with a typed property name. The property name can be used for filtering and specifying selection criteria. A collection of properties and their values comprise an entity. Since Table storage is schema-less, two entities in the same table can contain different collections of properties, and those properties can be of different types.

Table storage can be used to store flexible datasets, such as user data for web applications, address books, device information, and any other type of metadata that a service requires. Customers can store any number of entities in a table, and a storage account may contain any number of tables, up to the capacity limit of the storage account. Like Blobs and Queues, developers can manage and access Table storage using standard REST protocols. Table storage also supports a subset of the OData protocol, simplifying advanced querying capabilities and enabling both JavaScript Object Notation (JSON) and AtomPub (Extensible Markup Language (XML) based) formats. For today's Internet-based applications, NoSQL databases like Table storage offer a popular alternative to traditional relational databases.

Queue storage provides a reliable messaging solution for asynchronous communication between application components, whether they are running in the cloud, on a desktop, on an on-premises server, or on a mobile device. Queue storage also supports managing asynchronous tasks and building process workflows. A storage account can contain any number of queues. A queue can contain any number of messages, up to the capacity limit of the storage account.

Since a File storage share is a standard SMB file share, applications running in the cloud can access data in the share via file system I/O APIs. Like the other cloud storage services, File storage exposes a REST API for accessing data in a share. Distributed applications can also use File storage to store and share useful application data and development and testing tools.

Figure 2:
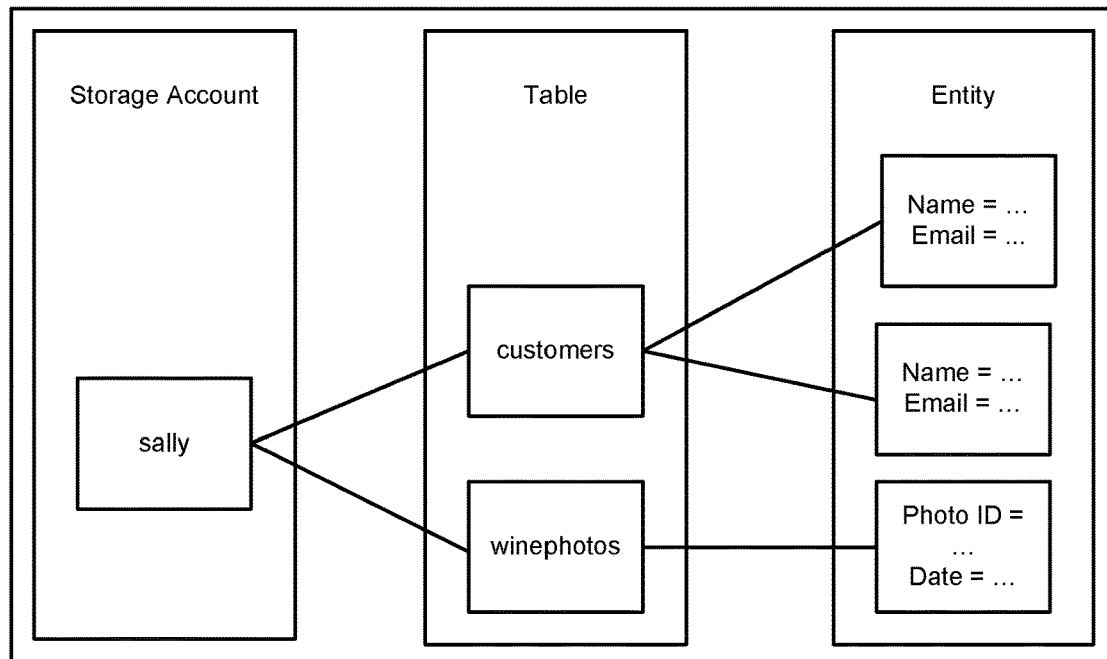
FIG. 2 shows an example of components of a Storage Table service.

FIG. 2 shows an example of components of a Storage Table service 4. For example, the components of the Storage Table service 4 include a storage account, tables, and entities. A Storage Table service offers structured storage in the form of storage tables. A storage account is a globally unique entity within the storage system. The storage account is the parent namespace for the Storage Table service and is the basis for authentication. A customer can create any number of storage tables within a given storage account as long as each table is uniquely named.

Storage Tables store data as collections of entities. Entities are similar to rows. An entity has a primary key and a set of properties. A property is a name, typed-value pair, similar to a column. The Storage Table service does not enforce any schema for storage tables. Therefore, two entities in the same storage table may have different sets of properties. Developers may choose to enforce a schema on the client side. A storage table may contain any number of entities.

A summary of storage accounts and storage tables that is useful for understanding the present disclosure follows. Storage account: All access to cloud storage is through a storage account. Storage Table: A storage table is a collection of entities. Storage Tables don't enforce a schema on entities, which means a single storage table can contain entities that have different sets of properties. The number of storage tables that a storage account can contain is limited only by the storage account capacity limit. Entity: An entity is a set of properties, similar to a database row. For example, an entity can be up to 1 MB (megabyte) in size. Properties: A property is a name-value pair. For example, each entity can include up to 252 properties to store data, and each entity can have 3 system properties that specify a partition key, a row key, and a timestamp. Entities with the same partition key can be queried more quickly, and inserted/updated in atomic operations. An entity's row key is its unique identifier within a partition.

Figure 3:
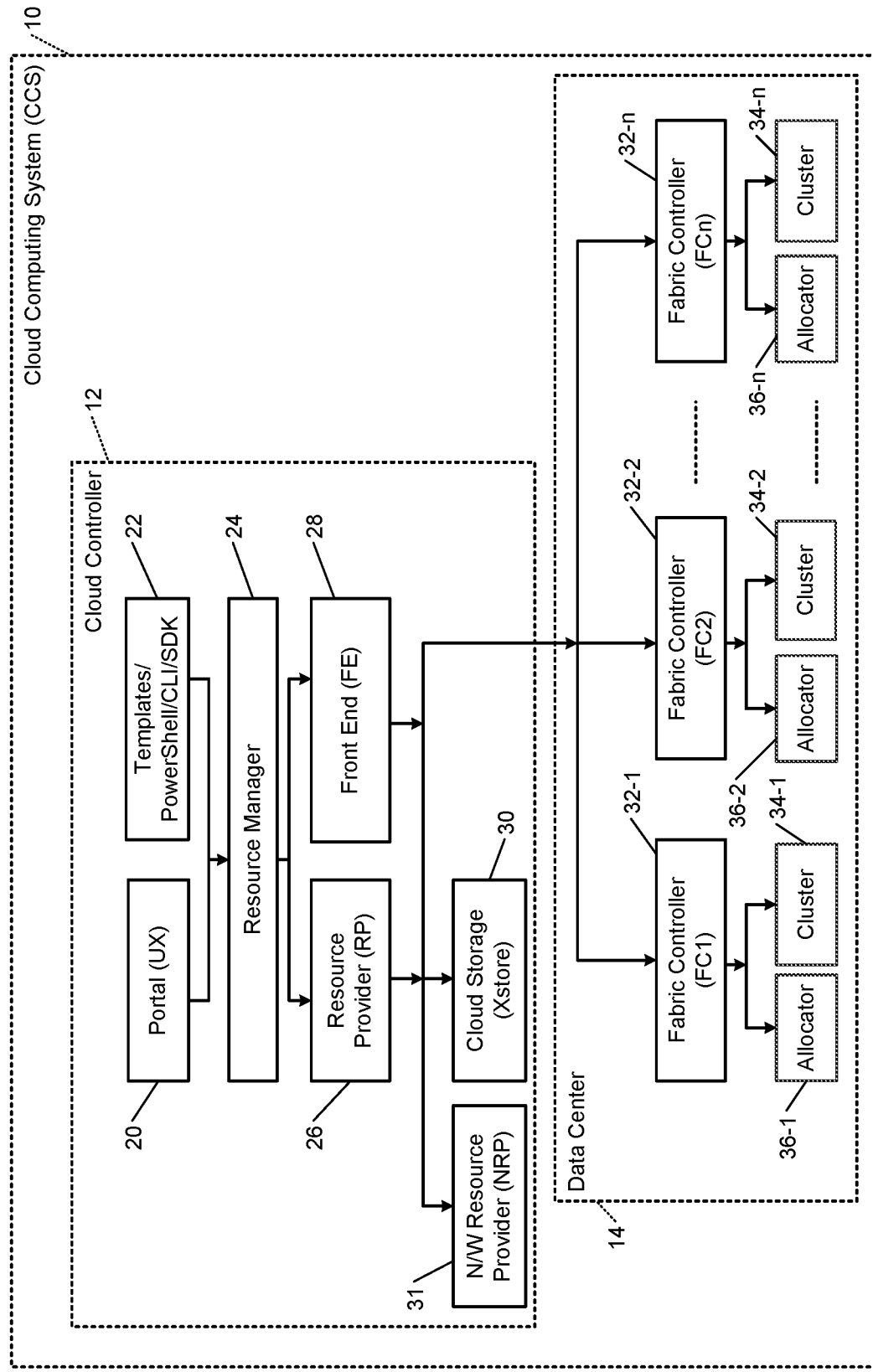
FIG. 3 is a functional block diagram of a simplified example of a cloud computing system.

FIG. 3 shows a simplistic example of a cloud computing system (CCS) 10. The cloud computing system 10 is only an example of a distributed storage system, which is the environment for the present disclosure. The cloud computing system 10 includes a cloud controller 12 and at least one datacenter 14. While only one datacenter 14 is shown for simplicity, the cloud controller 12 can interface with a plurality of datacenters. Further, while the datacenter 14 is shown as being local to the cloud controller 12, one or more datacenters may be geographically remote from the cloud controller 12, may be located in different geographic locations (e.g., in different time zones, different countries or continents, and so on), and may communicate with the cloud controller 12 via various networks.

Each datacenter 14 includes a plurality of fabric controllers 32-1, 32-2, . . . , and 32-n (collectively fabric controllers 32) and corresponding clusters 34-1, 34-2, . . . , and 34-n (collectively clusters 34). Each fabric controller 32 controls a respective cluster 34. Each cluster 34 includes a plurality of racks 62 (shown in FIGS. 3-4). Each rack 62 includes a plurality of nodes 72 (shown in FIG. 4), which are computing devices that are also called servers, hosts, or machines throughout the present disclosure. Each fabric controller 32 is associated with an allocator 36 that allocates resources within the cluster 34 for instances of customer services hosted on the cluster 34.

The cloud controller 12 includes a portal 20 and a software development kit (SDK) 22 that the customers can use to select resources and request service deployment. The cloud controller 12 further includes a cloud resource manager 24, a compute resource provider 26, and a front-end 28. The front-end 28 interfaces with the fabric controllers 32. The cloud resource manager 24 receives the customer selections and forwards the customer selections to the compute resource provider 26. The compute resource provider 26 generates a tenant model based on the customer selections. The compute resource provider 26 provisions resources to the customer services according to the tenant model generated based on the customer selections. The compute resource provider 26 provisions storage, networking, and computing resources by interfacing with a cloud storage (XStore) 30, a network resource provider 31, and the fabric controllers 32.

Figure 4:
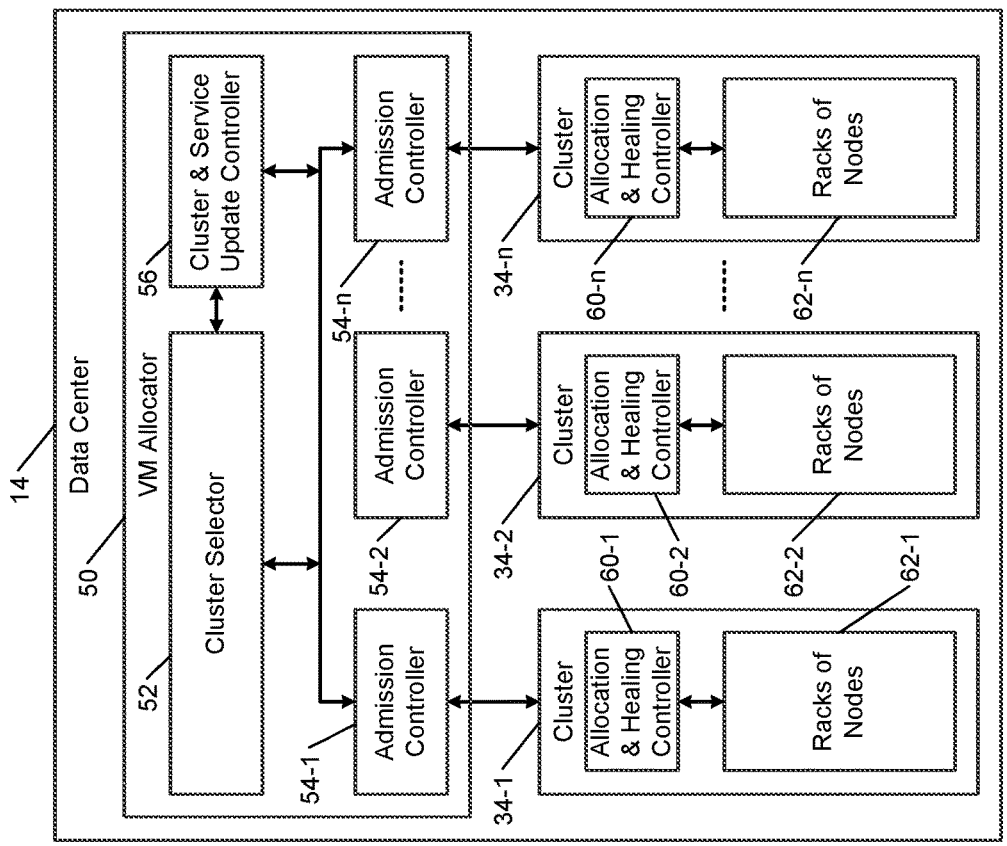
FIG. 4 is a functional block diagram of a simplified example of a datacenter shown in FIG. 3.

FIG. 4 shows a simplistic example of the datacenter 14 shown in FIG. 3. The datacenter 14 includes a VM allocator 50 and the clusters 34. The VM allocator 50 includes a cluster selector 52 and a plurality of admission controllers 54-1, 54-2, and . . . , and 54-n (collectively admission controllers 54). Each admission controller 54 is associated with a corresponding cluster 34. Each cluster 34 includes an allocation and healing controller 60 (shown as allocation and healing controllers 60-1, 60-2, . . . , and 60-n; one allocation and healing controller 60 per cluster 34) and one or more racks 62 of nodes (also called servers, hosts, or machines (generally computing devices). Each of the racks 62-1, 62-2, . . . , and 62-n (collectively racks 62) includes a plurality of nodes (shown in FIG. 5). The allocation and healing controller 60 can implement the allocator 36 of FIG. 3.

Allocating a VM can be a multilevel allocation operation. The VM allocator 50 first selects one of the clusters 34 in which to allocate a VM in association with the corresponding admission controller 54. After the VM allocator 50 selects one of the clusters 34 to allocate the VM, the allocation and healing controller 60 of the selected cluster 34 places the VM on one or more of the nodes in one or more of the racks 62 in the selected cluster 34 depending on the number of update and fault domains and other resources specified by the customer.

Based on VM activity in the clusters 34, a cluster and service update controller 56 provides updates to the cluster selector 52. For example, the VM activity may include activation and termination of one or more VM's in the clusters 34. The cluster and service update controller 56 may also provide updates to the cluster selector 52 regarding utilization of growth buffers due to service scale out and utilization of healing buffers due to node/rack failures.

Figure 5:
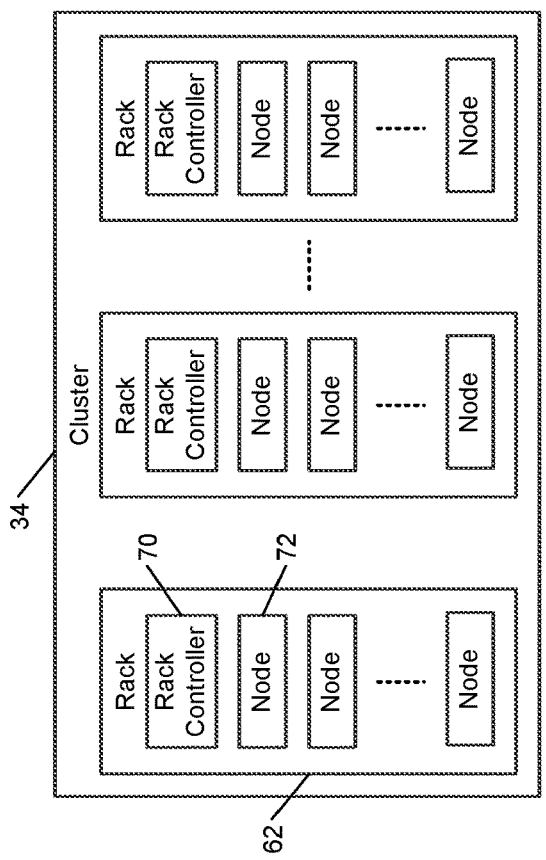
FIG. 5 is a functional block diagram of a simplified example of a cluster shown in FIG. 4.

FIG. 5 shows an example of the cluster 34 shown in FIGS. 3-4. Each cluster 34 includes the plurality of racks 62. Each rack 62 includes a rack controller 70 and a plurality of nodes 72. Each rack controller 70 includes a power controller that controls power allocation to the plurality of nodes 72 in the rack 62. The nodes 72 store data in the form of blobs, tables, queues, and file systems (see FIGS. 1-2) using a cloud storage system implemented by the cloud controller 12 shown in FIG. 3.

For example only, each cluster 34 may implement the encryption systems and methods of the present disclosure to provide fully managed account level data encryption in a distributed storage environment provided by a cloud storage system implemented by the cloud controller 12 (shown in FIG. 3). For example only, the encryption systems and methods of the present disclosure may also be implemented in the fabric controllers 32 shown in FIG. 3. To understand the encryption systems and methods of the present disclosure, the architecture of the cloud storage system implemented by the cloud controller 12 is described below in detail.

Figure 6:
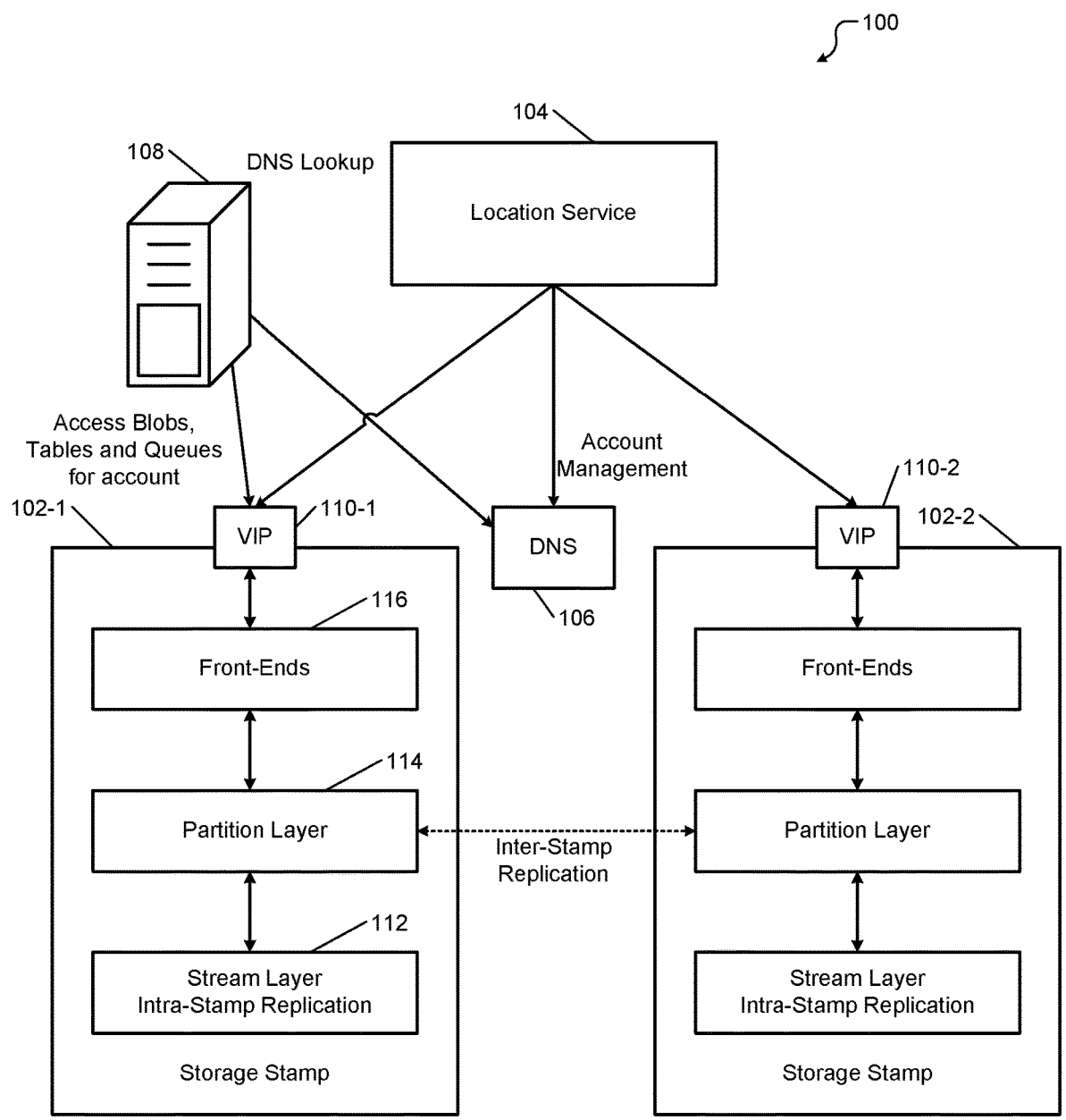
FIG. 6 is a functional block diagram of a cloud storage system that compresses and encrypts data according to the present disclosure.

The cloud controller 12 implements a cloud storage system (CSS) that provides customers the ability to store seemingly limitless amounts of data for any duration of time in a distributed storage environment (e.g., in clusters 34 in the datacenters 14). An example of the CSS is shown in FIG. 6. The CSS stores the data in the form of blobs, tables, queues, and file systems described above with reference to FIGS. 1-2. Customers have access to their data in the CSS from anywhere at any time and only pay for what they use and store. In the CSS, data is stored durably using both local and geographic replication to facilitate disaster recovery. Currently, the CSS storage comes in the form of Blobs (files), Tables (structured storage), and Queues (message delivery). A detailed description of the CSS architecture, global namespace, and data model, as well as its resource provisioning, load balancing, and replication systems follows. Data in the form of blobs is used throughout the present disclosure for illustrative purposes only. The teachings of the present disclosure apply equally to data in other forms such as tables, queues, and file systems.

The cloud storage system (CSS) implemented by the cloud controller 12 is a scalable cloud storage system that can be used for applications such as social networking search; serving video, music and game content; managing medical records, and more. In addition, thousands of customers can use the CSS, and anyone can sign up over the Internet to use the CSS.

The cloud storage system (CSS) provides cloud storage in the form of Blobs (user files), Tables (structured storage), and Queues (message delivery). These three data abstractions provide the overall storage and workflow for many applications. In a common usage pattern of the CSS, incoming and outgoing data is shipped via Blobs, with Queues providing the overall workflow for processing the Blobs, and intermediate service state and final results being kept in Tables or Blobs.

An example of the usage pattern is an ingestion engine service built on the cloud computing system (CCS) 10 to provide a near real-time search of a social networking website. This service is one part of a larger data processing pipeline that provides publically searchable content (via a search engine) within a few seconds of a user's posting or status update on the social networking website. The social networking website sends the raw public content to the CSS (e.g., user postings, user status updates, etc.) to be made publically searchable. This content is stored in Blobs in the CSS. The ingestion engine annotates this data with user auth, spam, and adult scores; content classification; and classification for language and named entities. In addition, the ingestion engine crawls and expands the links in the data. While processing, the ingestion engine accesses Tables in the CSS at high rates and stores the results back into Blobs. These Blobs are then folded into the search engine to make the content publically searchable. The ingestion engine uses Queues to manage the flow of work, the indexing jobs, and the timing of folding the results into the search engine.

The following are some of the features of the cloud storage system (CSS): a) Strong Consistency—Many customers, especially enterprise customers moving their line of business applications to the cloud, want strong consistency. They also want the ability to perform conditional reads, writes, and deletes for optimistic concurrency control on the strongly consistent data. For this feature, the CSS provides three properties that the CAP (Consistency, Availability, Partition tolerance) theorem claims are difficult to achieve at the same time: strong consistency, high availability, and partition tolerance.

b) Global and Scalable Namespace/Storage—For ease of use, the cloud storage system (CSS) implements a global namespace that allows data to be stored and accessed in a consistent manner from any location in the world. Since one of the goals of the CSS is to enable storage of massive amounts of data, this global namespace must be able to address exabytes of data and beyond.

c) Disaster Recovery—The cloud storage system (CSS) stores customer data across multiple datacenters 14 hundreds of miles apart from each other. This redundancy provides essential data recovery protection against disasters such as earthquakes, wild fires, tornados, nuclear reactor meltdown, etc.

d) Multi-tenancy and Cost of Storage—To reduce storage cost, many customers are served from the same shared storage infrastructure. The cloud storage system (CSS) combines the workloads of many different customers with varying resource needs together so that significantly less storage needs to be provisioned at any one point in time than if those services were run on their own dedicated hardware.

These features of the cloud storage system (CSS) are now described in more detail. The remainder of the detailed description of the CSS architecture is organized as follows. First, the global namespace used to access the Blob, Table, and Queue data abstractions in the CSS is explained. Next, a high level overview of the CSS architecture and its three layers: Stream, Partition, and Front-End layers is presented. Then the stream layer and the partition layer are described in detail.

Global Partitioned Namespace: The cloud storage system (CSS) provides a single global namespace that allows clients to address all of their storage in the cloud and scale to arbitrary amounts of storage needed over time. To provide this capability, the CSS leverages domain name servers (DNS) as part of the storage namespace and breaks the storage namespace into three parts: an account name, a partition name, and an object name. As a result, all data is accessible via a URI of the form:

http(s)://AccountName.<service>.core.windows.net/PartitionName/ObjectName

The AccountName is the customer selected account name for accessing storage in the cloud storage system (CSS) and is part of the DNS host name. The AccountName DNS translation is used to locate the primary storage cluster and data center where the data is stored in the CSS. This primary location is where all requests go to reach the data for that account. An application may use multiple AccountNames to store its data across different locations.

In conjunction with the AccountName, the PartitionName locates the data once a request reaches the storage cluster in the cloud storage system (CSS). The PartitionName is used to scale out access to the data across storage nodes based on traffic needs.

When a PartitionName holds many objects, the ObjectName identifies individual objects within that partition. The cloud storage system (CSS) supports atomic transactions across objects with the same PartitionName value. The ObjectName is optional since, for some types of data, the PartitionName uniquely identifies the object within the account.

This naming approach enables the cloud storage system (CSS) to flexibly support its three data abstractions. For blobs, the full blob name is the PartitionName. For Tables, each entity (row) in the table has a primary key that consists of two properties: the PartitionName and the ObjectName. This distinction allows applications using Tables to group rows into the same partition to perform atomic transactions across them. For Queues, the queue name is the PartitionName, and each message has an ObjectName to uniquely identify it within the queue.

The following is a high level description of the cloud storage system (CSS) architecture. The cloud platform (e.g., the cloud computing system (CCS) 10 shown in FIG. 3) runs many cloud services across different datacenters 14 and different geographic regions. The fabric controller 32 (shown in FIG. 3) is a resource provisioning and management layer that provides resource allocation, deployment/upgrade, and management for cloud services on the cloud platform. The cloud storage system (CSS) is one such service running on top of the fabric controller 32.

The fabric controller 32 provides node management, network configuration, health monitoring, starting/stopping of service instances, and service deployment for the cloud storage system (CSS) system. In addition, the CSS retrieves network topology information, physical layout of the clusters 34, and hardware configuration of the storage nodes 72 from the fabric controller 32. The CSS is responsible for managing the replication and data placement across the disks and load balancing the data and application traffic within the storage cluster 34.

FIG. 6 shows the architecture of the cloud storage system (CSS) (shown as CSS 100). The CSS 100 can store and provide access to an immense amount of storage (exa bytes and beyond). The CSS 100 is implemented by the cloud computing system (CCS) 10 shown in FIGS. 3-5.

The cloud storage system (CSS) 100 includes a plurality of storage stamps 102-1, 102-2, and so on (collectively storage stamps 102), a location service 104, and a Domain Name Server (DNS) 106. While only two storage stamps 102 are shown for illustrative purposes, the CSS 100 can include a plurality of storage stamps 102, each communicating with the location service 104.

Each storage stamp 102 is a cluster of N racks of storage nodes (e.g., racks 62 of nodes 72 shown in FIGS. 4-5), where N is an integer greater than or equal to 2. Each rack is built out as a separate fault domain with redundant networking and power. To provide low cost cloud storage, the cloud storage system (CSS) 100 may keep the provisioned storage as highly utilized as possible. For example, the CSS 100 may keep a storage stamp 102 around 70% utilized in terms of capacity, transactions, and bandwidth. For example, the CSS 100 may try to prevent the utilization from going above 80% so as to keep 20% of the storage capacity in reserve. The CSS 100 may utilize the reserve storage capacity for (a) disk short stroking to gain better seek time and higher throughput by utilizing outer tracks of disks, and (b) to continue providing storage capacity and availability in the presence of a rack failure within a storage stamp 102. When a storage stamp 102 reaches a predetermined utilization (e.g., 70% utilization), the location service 104 can migrate accounts to different storage stamps using inter-stamp replication explained below.

The location service 104 manages all the storage stamps 102. The location service 104 is also responsible for managing the account namespace across all the storage stamps 102. The location service 104 allocates accounts to the storage stamps 102 and manages them across the storage stamps 102 for disaster recovery and load balancing. The location service 104 may be distributed across two geographic locations for its own disaster recovery.

The cloud storage system (CSS) 100 can provide storage from multiple locations in different geographic regions (e.g., North America, Europe, and Asia). Each location is a data center with one or more buildings in that location, and each location holds multiple storage stamps 102. To provision additional capacity, the location service 104 has the ability to easily add new regions, new locations to a region, or new storage stamps 102 to a location. To increase the amount of storage, one or more new storage stamps 102 can be added to the location service 104 in the desired location's data center. The location service 104 can then allocate new storage accounts to those new storage stamps 102 for customers as well as load balance (migrate) existing storage accounts from older storage stamps 102 to the new storage stamps 102.

FIG. 6 shows the location service 104 with two storage stamps 102 and the layers within the storage stamps 102. The location service 104 tracks the resources used by each storage stamp 102 in production across all locations. When an application requests a new account for storing data, the application specifies a location affinity for the storage (e.g., United States (US) North). The location service 104 then chooses a storage stamp 102 within that location as a primary storage stamp 102 for the account using heuristics based on load information across all storage stamps 102 (which considers fullness of the storage stamps 102 and other metrics such as network and transaction utilization). The location service 104 then stores the account metadata information in the chosen storage stamp 102, which informs the chosen storage stamp 102 to start accepting traffic for the assigned account. The location service 104 then updates the DNS 106 to allow requests (e.g., from a device 108) to now be routed from the name https://AccountName.service.core.windows.net/ to a virtual IP (VIP) of the chosen storage stamp 102. A VIP is an IP address that a storage stamp 102 exposes for external traffic. For example, the storage stamp 102-1 has a VIP 110-1, the storage stamp 102-2 has a VIP 110-2, and so on.

Each storage stamp 102 has three layers, each comprising a plurality of servers (e.g., nodes 72 shown in FIG. 5): a stream layer 112, a partition layer 114, and a front end layer 116. Each layer is described below in turn.

The stream layer 112 includes a plurality of servers (e.g., nodes 72 shown in FIG. 5) that store data on disks. The stream layer 112 distributes and replicates the data across many servers to keep the data durable within a storage stamp 102. The stream layer 112 can be thought of as a distributed file system layer within a storage stamp 102. The stream layer 112 understands files, called streams (which are ordered lists of large storage chunks called extents), how to store them, how to replicate them, etc., but it does not understand higher level object constructs or their semantics. The data is stored in the stream layer 112, but the data is accessible from the partition layer 114. Partition servers (daemon processes in the partition layer) and stream servers may be co-located on each storage node in a storage stamp 102.

The partition layer 114 also includes a plurality of servers (e.g., nodes 72 shown in FIG. 5). The partition layer 114 (a) manages and understands higher level data abstractions (Blob, Table, Queue), (b) provides a scalable object namespace, (c) provides transaction ordering and strong consistency for objects, (d) stores object data on top of the stream layer 112, and (e) caches object data to reduce disk I/O.

The partition layer 114 also achieves scalability by partitioning all of the data objects within a storage stamp 102. As described earlier, all objects have a PartitionName; they are broken down into disjointed ranges based on the PartitionName values and served by different partition servers. The partition layer 114 manages which partition server is serving what PartitionName ranges for Blobs, Tables, and Queues. In addition, the partition layer 114 provides automatic load balancing of PartitionNames across the partition servers to meet the traffic needs of the objects.

The front end layer 116 includes a set of stateless servers that receive incoming requests. Upon receiving a request, a server in the front end layer 116 looks up the AccountName, authenticates and authorizes the request, then routes the request to a partition server in the partition layer 114 (based on the PartitionName). The system maintains a Partition Map that keeps track of the PartitionName ranges and which partition server is serving which PartitionNames. The front end servers cache the Partition Map and use it to determine which partition server to forward each request to. The front end servers also stream large objects directly from the stream layer 112 and cache frequently accessed data for efficiency.

Before describing the stream and partition layers in detail, a brief overview of two replication engines used by the cloud storage system (CSS) 100 is presented. The two replication engines are intra-stamp replication engine in the stream layer 112 and inter-stamp replication in the partition layer 114.

The intra-stamp replication engine in the stream layer 112 provides synchronous replication and is focused on making sure all the data written into a storage stamp 102 is kept durable within that storage stamp 102. The intra-stamp replication engine in the stream layer 112 keeps enough replicas of the data across different nodes in different fault domains to keep the data durable within the storage stamp 102 in the face of disk, node, and rack failures. The intra-stamp replication is performed in the stream layer 112 and is on the critical path of the customer's write requests. Once a transaction has been replicated successfully with intra-stamp replication, success can be returned back to the customer.

The inter-stamp replication in the partition layer 114 provides asynchronous replication and is focused on replicating data across storage stamps 102. The inter-stamp replication is performed in the background and is off the critical path of the customer's request. The inter-stamp replication is performed at the object level, where either the whole object is replicated or recent delta changes are replicated for a given account. The inter-stamp replication is used for (a) keeping a copy of an account's data in two locations for disaster recovery, and (b) migrating an account's data between storage stamps 102. The inter-stamp replication is configured for an account by the location service 104 and is performed by the partition layer 114.

The inter-stamp replication is focused on replicating objects and the transactions applied to those objects, whereas the intra-stamp replication is focused on replicating blocks of disk storage that are used to make up the objects. The intra-stamp replication provides durability against hardware failures, which can occur frequently in large scale systems, whereas inter-stamp replication provides geo-redundancy against geo-disasters, which are rare. The intra-stamp replication is provided with low latency since that is on the critical path of user requests whereas the focus of inter-stamp replication is optimal use of network bandwidth between storage stamps 102 while achieving an acceptable level of replication delay.

Performing intra-stamp replication at the stream layer 112 allows the amount of information that needs to be maintained to be scoped by the size of a single storage stamp 102. This focus allows all of the meta-state for intra-stamp replication to be cached in memory for performance, enabling the CSS 100 to provide fast replication with strong consistency by quickly committing transactions within a single storage stamp 102 for customer requests. In contrast, the partition layer 114 combined with the location service 104 controls and understands the global object namespace across stamps, allowing it to efficiently replicate and maintain object state across datacenters 14.

The stream layer 112 comprises a plurality of servers (e.g., nodes 72 shown in FIG. 5). The stream layer 112 provides an internal interface used only by the partition layer 114. It provides a file system like namespace and API, except that all writes are append-only. It allows clients (the partition layer 114) to open, close, delete, rename, read, append to, and concatenate these large files, which are called streams. A stream is an ordered list of extent pointers, and an extent is a sequence of append blocks.

Figure 7:
FIG. 7 shows an example of a data stream used to store data in the cloud storage system of FIG. 6.

FIG. 7 shows an example of a stream 150. For example, a stream "//foo" includes (pointers to) four extents (E1, E2, E3, and E4). Each extent includes a set of blocks $B_{ij}$ (i denotes extent number, and j denotes block number in extent i) that were appended to it. The extents E1, E2, and E3 are sealed extents. An extent that can no longer be appended is a sealed extent. A sealed extent is a read only extent. Only the last extent in a stream (e.g., extent E4 in the stream "//foo") can be appended to. If an application reads the data of the stream "//foo" from beginning to end, the application would get the block contents of the extents in the order E1, E2, E3, and E4.

A block is the smallest unit of data for writing and reading. A block can be up to N bytes (e.g., 4 MB). Data is written (appended) as one or more concatenated blocks to an extent, where blocks do not have to be the same size. A client does an append operation in terms of blocks and controls the size of each block. A read request from a client gives an offset to a stream or extent, and the stream layer 112 reads as many blocks as needed at the offset to fulfill the length of the read operation. When performing a read operation, the entire contents of a block are read. This is because the stream layer 112 stores its checksum validation at the block level, one checksum per block. The whole block is read to perform the checksum validation, and the checksum is checked for every block read. In addition, all the blocks in the system are validated against their checksums periodically (e.g., once every few days) to check for data integrity issues.

The extents are the unit of replication in the stream layer 112. For example, a default replication policy may be to keep three replicas within a storage stamp 102 for an extent. Each extent may be stored in a new technology file system (NTFS) file and includes a sequence of blocks. For example, a target extent size used by the partition layer may be 1 GB. To store small objects, the partition layer 114 appends many small objects to the same extent and even in the same block. To store large TB-sized objects (Blobs), the object is broken up over many extents by the partition layer 114. The partition layer 114 keeps track of streams, extents, and byte offsets in the extents in which objects are stored using an index.

Every stream has a name in the hierarchical namespace maintained at the stream layer 112. A stream looks like a big file to the partition layer 114. Streams are appended to and can be randomly read from. A stream is an ordered list of pointers to extents which is maintained by a stream manager (explained below). When the extents are concatenated together, they represent the full contiguous address space in which the stream can be read in the order they were added to the stream. A new stream can be constructed by concatenating extents from existing streams, which is a fast operation since it just updates a list of pointers. Only the last extent in the stream can be appended to. All of the prior extents in the stream are immutable.

Figure 8:
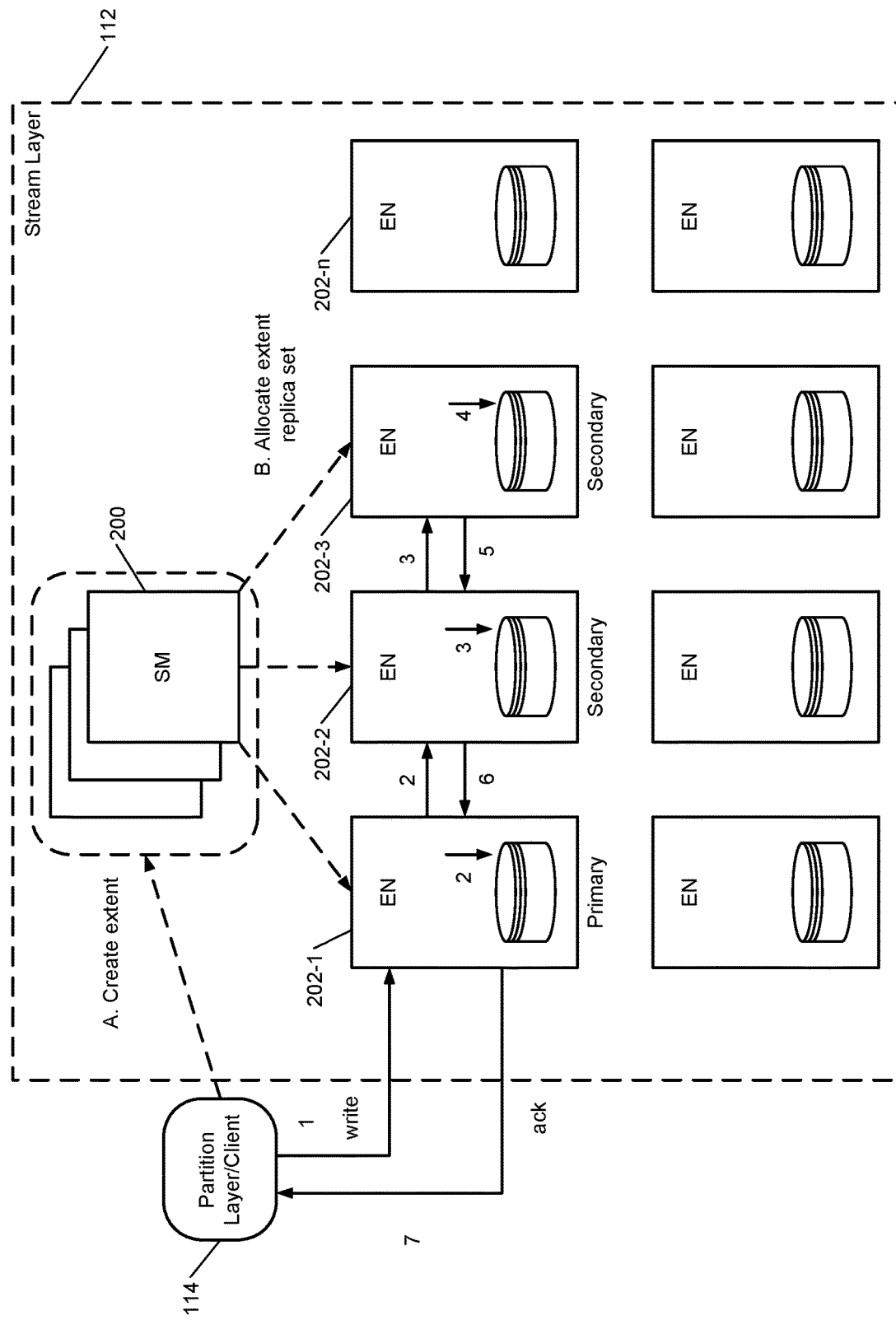
FIG. 8 is a functional block diagram of a stream layer of the cloud storage system of FIG. 6.

FIG. 8 shows the stream layer 112 in further detail. The stream layer 112 includes a stream manager 200 and a plurality of extent nodes (ENs) 202-1, 202-2, ..., and 202-n, where n is an integer greater than 1 (collectively extent nodes 202 or ENs 202). The stream manager 200 keeps track of the stream namespace, what extents are in each stream, and the extent allocation across the extent nodes 202. The stream manager 200 is off the critical path of client requests. The stream manager 200 (a) maintains the stream namespace and state of all active streams and extents, (b) monitors the health of the extent nodes 202, (c) creates and assigns extents to the extent nodes 202, (d) performs the lazy re-replication of extent replicas that are lost due to hardware failures or unavailability, (e) performs garbage collection (defragmentation) of extents that are no longer pointed to by any stream, and (f) schedules erasure coding of extent data according to a stream policy (explained below).

The stream manager 200 periodically polls (syncs) the state of the extent nodes 202 and learns what extents are stored in the extent nodes 202. If the stream manager 200 discovers that an extent is replicated on fewer than expected number of extent nodes 202, a re-replication of the extent will lazily be created by the stream manager 200 to regain the desired level of replication. For extent replica placement, the stream manager 200 randomly chooses extent nodes 202 across different fault domains so that extent replicas are stored on extent nodes 202 that will not have correlated failures due to power, network, or being on the same rack.

The stream manager 200 does not have knowledge about blocks, just streams and extents. The stream manager 200 is off the critical path of client requests and does not track each block append, since the total number of blocks can be huge and the stream manager 200 cannot scale to track those. Since the stream and extent state is only tracked within a single storage stamp 102, the amount of state can be kept small enough to fit in the memory of the stream manager 200. The only client of the stream layer 112 is the partition layer 114. The partition layer 114 and the stream layer 112 are co-designed so that they will not use more than 50 million extents, for example, and no more than 100,000 streams for a single storage stamp 102, for example. This kind of parameterization can comfortably fit into 32 GB of memory for the stream manager 200, for example.

Each extent node 202 maintains the storage for a set of extent replicas assigned to it by the stream manager 200. An extent node 202 has N disks attached (N is an integer greater than 1), which the extent node 202 completely controls for storing extent replicas and their blocks. An extent node 202 knows nothing about streams, and only handles extents and blocks. Internally on an extent node 202 server, every extent on a disk is a file, which holds data blocks and their checksums, and an index which maps extent offsets to blocks and their file location.

Each extent node 202 includes a view about the extents it owns and where the peer replicas are for a given extent. This view is a cache kept by the extent node 202 of the global state that the stream manager 200 keeps. The extent nodes 202 only communicate with other extent nodes 202 to replicate block writes (appends) sent by a client, or to create additional copies of an existing replica when instructed by the stream manager 200. When an extent is no longer referenced by any stream, the stream manager 200 garbage collects (defragments) the extent and notifies the extent nodes 202 to reclaim the space.

The append operation and sealed extent are now explained in more detail. Streams can only be appended to; existing data cannot be modified. The append operations are atomic: either the entire data block is appended, or nothing is appended. Multiple blocks can be appended at once, as a single atomic multi-block append operation. The minimum read size from a stream is a single block. The multi-block append operation allows writing a large amount of sequential data in a single append and later performing small reads. The contract used between the client (the partition layer 114) and the stream layer 112 is that the multi-block append will occur atomically, and if the client never hears back for a request (due to failure), the client should retry the request (or seal the extent). This contract implies that the client needs to expect the same block to be appended more than once in face of timeouts and correctly deal with processing duplicate records.

The partition layer 114 handles duplicate records in two ways. For metadata and commit log streams, all of the transactions written have a sequence number and duplicate records will have the same sequence number. For row data and blob data streams, for duplicate writes, only the last write will be pointed to by RangePartition data structures. So prior duplicate writes will have no references and will be garbage collected later.

An extent has a target size specified by the client (the partition layer 114). When an extent fills up to that size, the extent is sealed at a block boundary, and then a new extent is added to the stream, and appends continue into that new extent. Once an extent is sealed, it can no longer be appended to. A sealed extent is immutable, and the stream layer 112 performs some optimizations on sealed extents such as erasure coding cold extents. Extents in a stream do not have to be the same size, and they can be sealed anytime and can even grow arbitrarily large.

The stream layer intra-stamp replication is now described. The stream layer 112 and the partition layer 114 are co-designed to provide strong consistency at the object transaction level. The correctness of the partition layer 114 providing strong consistency is built upon the following guarantees from the stream layer 112: 1) Once a record is appended and acknowledged back to the client, any later reads of that record from any replica will see the same data (the data is immutable). 2) Once an extent is sealed, any reads from any sealed replica will always see the same contents of the extent.

The datacenter 14, the fabric controller 32, and the CSS 100 have security mechanisms in place to guard against malicious adversaries. So the stream replication does not deal with such threats. Instead, the stream replication deals with faults ranging from disk and node errors to power failures, network issues, bit-flip and random hardware failures, as well as software bugs. These faults can cause data corruption; checksums are used to detect such corruption. The following description of the intra-stamp replication scheme is within this context.

FIG. 8 shows an example of the replication flow. For example, when a stream is first created (step A), the stream manager 200 assigns three replicas for the first extent (one primary and two secondary) to three extent nodes 202 (step B), which are chosen by the stream manager 200 to randomly spread the replicas across different fault and upgrade domains while considering extent node usage (for load balancing). In addition, the stream manager 200 decides which replica will be primary for the extent.

Writes to an extent are performed from the client to a primary extent node (e.g., 202-1). The primary extent node 202-1 coordinates the write to two secondary extent nodes (e.g., 202-2, 202-3). The primary extent node 202-1 and the location of the three replicas do not change for an extent while the extent is being appended to (while the extent is unsealed). Therefore, no leases are used to represent the primary extent node 202-1 for an extent, since the primary extent node 202-1 is fixed while an extent is unsealed.

When the stream manager 200 allocates an extent, the extent information is sent back to the client, which then knows which extent nodes 202 hold the three replicas and which one is the primary extent node. This state is now part of the stream's metadata information held in the stream manager 200 and cached on the client. When the last extent in the stream that is being appended to becomes sealed, the same process repeats. The stream manager 200 then allocates another extent, which now becomes the last extent in the stream, and all new appends now go to the new last extent for the stream.

For an extent, every append operation is replicated three times across the extent's replicas. A client sends all write requests to the primary extent node 202-1, but it can read from any replica (202-1, 202-2, 202-3), even for unsealed extents. The append is sent to the primary extent node 202-1 for the extent by the client, and the primary extent node 202-1 then (a) determines the offset of the append in the extent, (b) orders (chooses the offset of) all of the appends if there are concurrent append requests to the same extent outstanding, (c) sends the append with its chosen offset to the two secondary extent nodes 202-2, 202-3, and (d) only returns success for the append to the client after a successful append has occurred to disk for all three extent nodes 202-1, 202-2, 202-3.

FIG. 8 shows the sequence of steps during an append operation (labeled with numbers 1-7). Only when all of the writes have succeeded for all three replicas 202-1, 202-2, 202-3 will the primary extent node 202-1 then respond to the client that the append was a success. If there are multiple outstanding appends to the same extent, the primary extent node 202-1 will return success in the order of their offset (commit them in order) to the clients. As appends commit in order for a replica, the last append position is considered to be the current commit length of the replica. The bits are the same between all replicas due to the fact that the primary extent node 202-1 for an extent does not change; it picks the offset for appends, appends for an extent are committed in order; and due to the manner in which extents are sealed upon failures (explained below).

When a stream is opened, the metadata for its extents is cached at the client. So the client can directly request the extent nodes 202 for reading and writing without communicating with the stream manager 200 until the next extent needs to be allocated for the stream. If during writing, one of the replica's extent node 202 is not reachable, or if there is a disk failure for one of the replicas, a write failure is returned to the client. The client then contacts the stream manager 200, and the extent that was being appended to is sealed by the stream manager 200 at its current commit length. At this point the sealed extent can no longer be appended to. The stream manager 200 will then allocate a new extent with replicas on different (available) extent nodes 202, which makes it the last extent of the stream. The information for this new extent is returned to the client. The client then continues appending to the stream with its new extent.

This process of sealing an extent by the stream manager 200 and allocating the new extent is performed quickly (e.g., on average within 20 ms). The client can continue appending to a stream as soon as the new extent is allocated, and it does not rely on a specific extent node 202 to become available again. For the newly sealed extent, the stream manager 200 creates new replicas to bring it back to the expected level of redundancy in the background if needed.

Sealing extents is now explained in further detail. From a high level, the stream manager 200 coordinates the sealing operation among the extent nodes 202. The stream manager 200 determines the commit length of the extent used for sealing based on the commit length of the extent replicas. Once the sealing is done, the commit length will not change again.

To seal an extent, the stream manager 200 gets from all the extent nodes 202 (in the above example, three extent nodes 202-1, 202-2, 202-3) their current commit length. During sealing, either all replicas have the same commit length, which is the simple case, or a given replica is longer or shorter than another replica for the extent. This latter case can only occur during an append failure where some but not all of the extent nodes 202 for the replica are available (i.e., some of the replicas get the append block, but not all of them).

The stream manager 200 seals the extent even if the stream manager 200 may not be able to reach all the extent nodes 202 involved. When sealing the extent, the stream manager 200 chooses the smallest commit length based on the available extent nodes 202 it can communicate with. This does not cause data loss since the primary extent node (in the above example, extent node 202-1) does not return success unless all replicas are written to disk for all the extent nodes 202 (in the above example, three extent nodes 202-1, 202-2, 202-3). This means the smallest commit length is sure to contain all the writes that have been acknowledged to the client.

In addition, it is also fine if the final commit length contains blocks that were not acknowledged back to the client, since the client (the partition layer 114) correctly handles these as described previously (see the description of the append operation and sealed extent above). During sealing, all of the extent replicas that were reachable by the stream manager 200 are sealed to the commit length chosen by the stream manager 200.

Once sealing is done, the commit length of the extent does not change. If an extent node 202 was not reachable by the stream manager 200 during the sealing process but later becomes reachable, the stream manager 200 forces that extent node 202 to synchronize the given extent to the chosen commit length. This ensures that once an extent is sealed, all its available replicas (the ones the stream manager 200 can eventually reach) are bitwise identical.

The interaction of the stream layer 112 with the partition layer 114 is now described. At times, due to network partitioning, a client (the partition server 114) is still able to communicate with an extent node 202 that the stream manager 200 could not communicate with during the sealing process. The following description explains how the partition layer 114 handles this case.

The partition layer 114 has two different read patterns: 1) The partition layer 114 reads records at known locations. The partition layer 114 uses two types of data streams (row and blob). For these streams, it reads at specific locations (extent+offset, length). More importantly, the partition layer 114 will only read these two streams using the location information returned from a previous successful append at the stream layer 112. That will only occur if the append was successfully committed to all the replicas involved (in the above example, three extent nodes 202-1, 202-2, 202-3). The replication scheme guarantees such reads always see the same data.

2) The partition layer 114 iterates all records sequentially in a stream on partition load. Each partition has two additional streams (metadata and commit log). These are the only streams that the partition layer 114 will read sequentially from a starting point to the very last record of a stream. This operation only occurs when the partition is loaded (explained below in the detailed description of the partition layer 114). The partition layer 114 ensures that no useful appends from the partition layer 114 will happen to these two streams during partition load. Then the partition layer 114 and the stream layer 112 together ensure that the same sequence of records is returned on partition load.

At the start of a partition load, the partition server sends a check for commit length request to the primary extent node (in the above example, extent node 202-1) of the last extent of these two streams. This checks whether all the replicas are available and that they all have the same length. If not, the extent is sealed and reads are only performed during partition load against a replica sealed by the stream manager 200. This ensures that the partition load will see all of its data and the exact same view even if the same partition is repeatedly loaded by reading from different sealed replicas for the last extent of the stream.

To reduce the cost of storage, the cloud storage system (CSS) erasure codes sealed extents for Blob storage. The CSS breaks an extent into N roughly equal sized fragments at block boundaries. Then the CSS adds M error correcting code fragments using Reed-Solomon for the erasure coding algorithm. As long as the CSS does not lose more than M fragments (across the data fragments+code fragments), the CSS can recreate the full extent.

Erasure coding sealed extents reduces the cost of storing data. For example, following the above example of three replicas, erasure coding sealed extents reduces the cost of storing data from three full replicas within a storage stamp 102, which is three times the original data, to only 1.3×-1.5× the original data, depending on the number of fragments used. In addition, erasure coding increases the durability of the data when compared to keeping multiple (e.g., three) replicas within a storage stamp 102.

Read load-balancing is now explained. When reads are issued for an extent that has multiple (e.g., three) replicas, they are submitted with a deadline value which specifies that the read operation should not be attempted if it cannot be fulfilled within the deadline. If an extent node 202 determines that the read operation cannot be fulfilled within the time constraint, the extent node 202 will immediately reply to the client that the deadline cannot be met. This mechanism allows the client to select a different extent node 202 to read that data from, likely allowing the read operation to complete faster.

This method is also used with erasure coded data. When reads cannot be serviced in a timely manner due to a heavily loaded spindle to the data fragment, the read operation may be serviced faster by doing a reconstruction rather than reading that data fragment. In this case, reads (for the range of the fragment needed to satisfy the client request) are issued to all fragments of an erasure coded extent, and the first N responses are used to reconstruct the desired fragment.

Durability and journaling in the stream layer 112 is now described. An example of a durability contract for the stream layer 112 may be that when data is acknowledged as written by the stream layer 112, there must be at least three durable copies of the data stored in the system (following the above example). This contract allows the system to maintain data durability even in the face of a cluster-wide power failure. The storage system is operated in such a way that all writes are made durable to power safe storage before they are acknowledged back to the client.

As part of maintaining the durability contract while still achieving good performance, on each extent node 202, a whole disk drive or a solid state disk (SSD) is reserved as a journal drive for all writes to the extent node 202. The journal drive is dedicated solely for writing a single sequential journal of data. When the partition layer 114 does a stream append, the data is written by the primary extent node 202 (e.g., extent node 202-1) and is also sent in parallel to the two secondary extent nodes 202 (e.g., extent nodes 202-2, 202-3) to be written. When each extent node 202 performs an append operation, it (a) writes all of the data for the append operation to the journal drive and (b) queues up the append operation to go to the data disk where the extent file lives on that extent node 202. Once either succeeds, success can be returned to client.

If the journal succeeds first, the data is also buffered in memory while it goes to the data disk, and any reads for that data are served from memory until the data is on the data disk. From that point on, the data is served from the data disk. This also enables combining contiguous writes into larger writes to the data disk, and better scheduling of concurrent writes and reads to get the best throughput. It is a tradeoff for good latency at the cost of an extra write off the critical path.

Although the stream layer 112 is an append-only system, adding a journal drive provides important benefits since the appends do not have to contend with reads going to the data disk in order to commit the result back to the client. The journal allows the append times from the partition layer to have more consistent and lower latencies.

Figure 9:
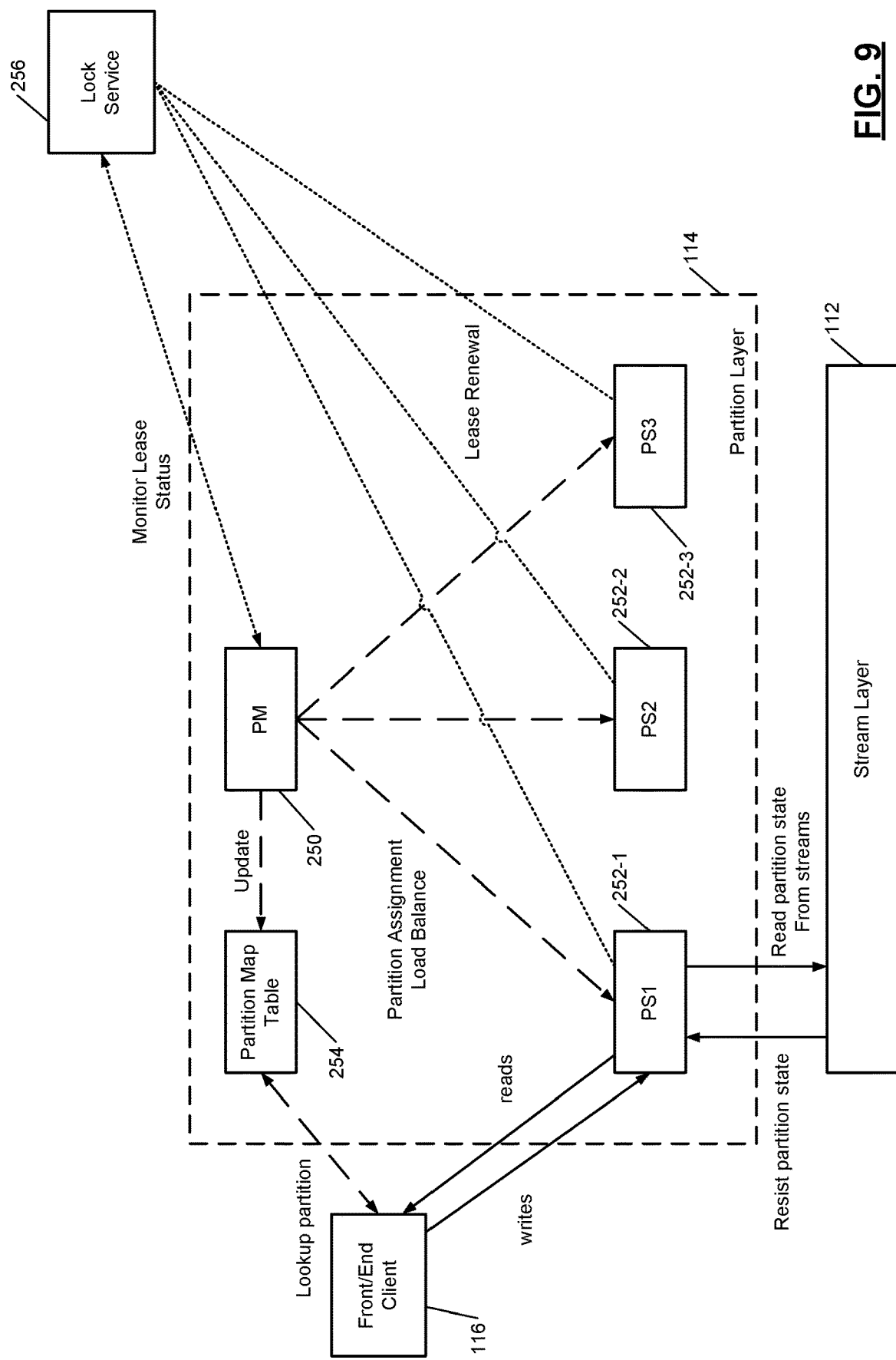
FIG. 9 is a functional block diagram of a partition layer of the cloud storage system of FIG. 6.

FIG. 9 shows the partition layer 114 in detail. The partition layer 114 includes a partition manager 250, a plurality of partition servers 252-1, 252-2, 252-3 (collectively partition servers 252), a partition map table 254, and a lock service 256. While only three partition servers 252 are shown, additional partition servers are contemplated.

The partition layer 114 stores the different types of objects and understands what a transaction means for a given object type (Blob, Table, or Queue). The partition layer 114 provides (a) a data model for the different types of objects stored, (b) logic and semantics to process the different types of objects, (c) massively scalable namespace for the objects, (d) load balancing to access objects across the available partition servers, and (e) transaction ordering and strong consistency for access to objects.

The partition layer data model is now explained in detail. The partition layer 114 provides an internal data structure called an Object Table (OT). An OT is a massive table which can grow to several petabytes. Object Tables are dynamically broken up into RangePartitions (based on traffic load to the table) and spread across the partition servers 252 in a storage stamp 102. A RangePartition is a contiguous range of rows in an OT from a given low-key to a high-key. All RangePartitions for a given OT are non-overlapping, and every row is represented in some RangePartition.

The following are the Object Tables (OTs) used by the partition layer 114. An Account Table stores metadata and configuration for each storage account assigned to the storage stamp 102. A Blob Table stores all blob objects for all accounts in the storage stamp 102. An Entity Table stores all entity rows for all accounts in the storage stamp 102. A Message Table stores all messages for all accounts' queues in the storage stamp 102. A Schema Table keeps track of the schema for all OTs. The Partition Map Table 254 keeps track of the current RangePartitions for all Object Tables and what partition server 252 is serving each RangePartition. The Partition Map Table 254 is used by the servers of the front end layer 116 to route requests to the corresponding partition servers 252.

Each of the above OTs has a fixed schema stored in the Schema Table. The primary key for the Blob Table, Entity Table, and Message Table includes three properties: AccountName, PartitionName, and ObjectName. These properties provide the indexing and sort order for those Object Tables.

Supported data types and operations are now explained. The property types supported for an OT's schema are the standard simple types (e.g., bool, binary, string, DateTime, double, globally unique identifier (GUID), int32, int64). In addition, the system supports two special types—DictionaryType and BlobType. The DictionaryType allows for flexible properties (i.e., without a fixed schema) to be added to a row at any time. These flexible properties are stored inside of the dictionary type as (name, type, value) tuples. From a data access standpoint, these flexible properties behave like first-order properties of the row and are queryable just like any other property in the row.

A BlobType is a special property used to store large amounts of data and is used by the Blob Table. BlobType avoids storing the blob data bits with the row properties in a row data stream. Instead, the blob data bits are stored in a separate blob data stream and a pointer to the blob's data bits (list of "extent+offset, length" pointers) is stored in the BlobType's property in the row. This keeps the large data bits separated from the OT's queryable row property values stored in the row data stream.

The OTs support standard operations including insert, update, and delete operations on rows as well as query/get operations. In addition, the OTs allow batch transactions across rows with the same PartitionName value. The operations in a single batch are committed as a single transaction. The OTs provide snapshot isolation to allow read operations to happen concurrently with writes.

The architecture of the partition layer 114 is now described in detail. The partition layer 114 includes three main architectural components as shown in FIG. 9: the partition manager (PM) 250, the partition servers (PS) 252, and the lock service 256. Each component is described below in turn.

The partition manager (PM) 250 keeps track of and splits the massive Object Tables into RangePartitions. The partition manager 250 assigns each RangePartition to a partition server 252 to serve access to the objects. The partition manager 250 splits the Object Tables into N RangePartitions in each storage stamp 102, keeping track of the current RangePartition breakdown for each OT and to which partition servers 252 they are assigned. The partition manager 250 stores this assignment in the Partition Map Table 254.

The partition manager 250 ensures that each RangePartition is assigned to exactly one active partition server 252 at any time, and that two RangePartitions do not overlap. The partition manager 250 is also responsible for load balancing RangePartitions among partition servers 252. Each storage stamp 102 has multiple instances of the partition manager 250 running, and they all contend for a leader lock that is stored in the lock service 256 (see below). The partition manager 250 with the lease is the active partition manager 250 controlling the partition layer 114.

A partition server 252 serves requests to a set of RangePartitions assigned to it by the partition manager 250. The partition server 252 stores all the persistent state of the partitions into streams and maintains a memory cache of the partition state for efficiency. No two partition servers 252 can serve the same RangePartition at the same time by using leases with the lock service 256. This allows the partition server 252 to provide strong consistency and ordering of concurrent transactions to objects for a RangePartition it is serving. A partition server 252 can concurrently serve multiple RangePartitions from different OTs.

The lock service 256 is used for leader election for the partition manager 250. In addition, each partition server 252 also maintains a lease with the lock service 256 in order to serve partitions.

On failure of a partition server 252, all N RangePartitions served by the failed partition server 252 are assigned to available partition servers 252 by the partition manager 250. The partition manager 250 will choose N partition servers 252, based on the load on those servers. The partition manager 250 assigns a RangePartition to a partition server 252, and then updates the Partition Map Table 254 specifying what partition server 252 is serving each RangePartition. This allows the front end layer 116 to find the location of RangePartitions by looking in the Partition Map Table 254 (see FIG. 9). When the partition server 252 gets a new assignment, the partition server 252 starts serving the new RangePartitions for as long as the partition server 252 holds its partition server lease.

Figure 10:
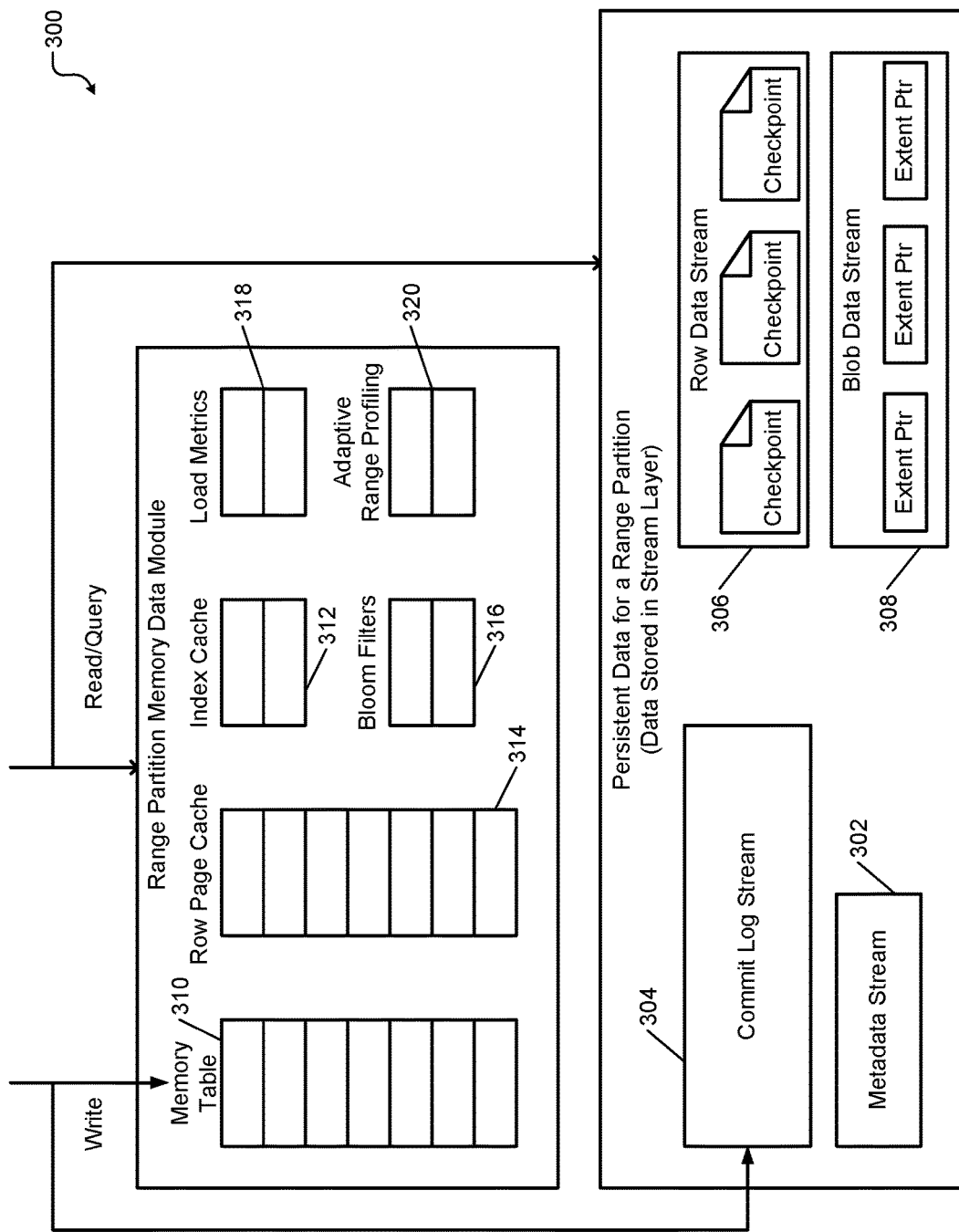
FIG. 10 shows a data structure used by the partition layer of the cloud storage system of FIG. 6.

FIG. 10 shows RangePartition data structures 300. A partition server 252 serves a RangePartition by maintaining a set of in-memory data structures and a set of persistent data structures in streams. The persistent data structures include a metadata stream 302, a commit log stream 304, a row data stream 306, and a blob data stream 308. The in-memory data structures include a memory table 310, an index cache 312, a row data cache 314, and bloom filters 316. All these data structures are described below in detail.

A RangePartition uses a log-structured merge-tree to maintain its persistent data. Each Object Table's RangePartition includes its own set of streams in the stream layer 112. The streams belong solely to a given RangePartition, though the underlying extents can be pointed to by multiple streams in different RangePartitions due to RangePartition splitting. The following are the set of streams that comprise each RangePartition.

The metadata stream 302 is the root stream for a RangePartition. The partition manager 250 assigns a partition to a partition server 252 by providing the name of the RangePartition's metadata stream 302. The metadata stream 302 includes enough information for the partition server 252 to load a RangePartition. The information includes the name of the commit log stream 304 and data streams for that RangePartition. The information also includes pointers (extent+offset) into those streams for where to start operating in those streams (e.g., where to start processing in the commit log stream 304 and the root of the index for the row data stream 306). The partition server 252 serving the RangePartition also writes in the metadata stream 302 the status of outstanding split and merge operations that the RangePartition may be involved in.

The commit log stream 304 is a commit log used to store the recent insert, update, and delete operations applied to the RangePartition since the last checkpoint was generated for the RangePartition. The row data stream 306 stores the checkpoint row data and index for the RangePartition.

Each RangePartition in an Object Table has only one data stream, except the Blob Table. A RangePartition in the Blob Table has a row data stream 306 for storing its row checkpoint data (the blob index), and a separate blob data stream 308 for storing the blob data bits for the special BlobType described earlier.

A partition server 252 maintains the following in-memory components as shown in FIG. 10. The memory table 310 is the in-memory version of the commit log 304 for a RangePartition, including all of the recent updates that have not yet been checkpointed to the row data stream 306. When a lookup occurs, the memory table 310 is checked to find recent updates to the RangePartition.

The index cache 312 stores the checkpoint indexes of the row data stream 306. The index cache 312 is separate from the row data cache 314 so as to keep as much of the main index cached in memory as possible for a given RangePartition.

The row data cache 314 is a memory cache of the checkpoint row data pages. The row data cache 314 is read-only. When a lookup occurs, both the row data cache 314 and the memory table 310 are checked, giving preference to the memory table 310.

If the data is not found in the memory table 310 or the row data cache 314, then the index/checkpoints in the data stream need to be searched. It can be expensive to blindly examine them all. Therefore a bloom filter 316 is used for each checkpoint, which indicates if the row being accessed may be in the checkpoint.

The data flow is now described. When the partition server 252 receives a write request to the RangePartition (e.g., insert, update, delete), the partition server 252 appends the operation into the commit log 304, and then puts the newly changed row into the memory table 310. Therefore, all the modifications to the partition are recorded persistently in the commit log 304, and also reflected in the memory table 310. At this point success can be returned back to the client (the servers of the front end layer 116) for the transaction.

When the size of the memory table 310 reaches its threshold size or the size of the commit log stream 304 reaches its threshold, the partition server 252 will write the contents of the memory table 310 into a checkpoint stored persistently in the row data stream 306 for the RangePartition. The corresponding portion of the commit log 304 can then be removed. To control the total number of checkpoints for a RangePartition, the partition server 252 periodically combines the checkpoints into larger checkpoints, and then removes the old checkpoints via garbage collection (described below in detail).

For the Blob Table's RangePartitions, the Blob data bits are also stored directly into the commit log stream 304 (to minimize the number of stream writes for Blob operations), but those data bits are not part of the row data so they are not put into the memory table 310. Instead, the BlobType property for the row tracks the location of the Blob data bits (extent+offset, length). During checkpoint, the extents that would be removed from the commit log 304 are instead concatenated to the RangePartition's Blob data stream. Extent concatenation is a fast operation provided by the stream layer 112 since it includes just adding pointers to extents at the end of the Blob data stream without copying any data.

A partition server 252 can start serving a RangePartition by loading the partition. Loading a partition involves reading the metadata stream of the RangePartition to locate the active set of checkpoints and replaying the transactions in the commit log 304 to rebuild the in-memory state. Once these are done, the partition server 252 has the up-to-date view of the RangePartition and can start serving requests.

RangePartition load balancing is now described in detail. The partition layer 114 breaks the massive Object Tables into RangePartitions and performs the function of automatically load balancing them across the partition servers 252 to meet their varying traffic demands.

The partition manager 250 performs three operations to spread load across partition servers 252 and control the total number of partitions in a storage stamp 102: 1) A load balancing operation identifies when a given partition server 252 has too much traffic and reassigns one or more RangePartitions to less loaded partition servers 252. 2) A split operation identifies when a single RangePartition has too much load and splits the RangePartition into two or more smaller and disjoint RangePartitions, then load balances (reassigns) them across two or more partition servers 252. 3). A merge operation merges together cold or lightly loaded RangePartitions that together form a contiguous key range within their object table (OT). Merge is used to keep the number of RangePartitions within a bound proportional to the number of partition servers 252 in a storage stamp 102.

The cloud storage system (CSS) 100 keeps the total number of partitions between a low watermark and a high watermark (typically around ten times the number of partition servers 252 within a storage stamp 102). At equilibrium, the partition count will stay around the low watermark. If there are unanticipated traffic bursts that concentrate on a single RangePartition, it will be split to spread the load. When the total RangePartition count is approaching the high watermark, the system will increase the merge rate to eventually bring the RangePartition count down towards the low watermark. Therefore, the number of RangePartitions for each object table (OT) changes dynamically based upon the load on the objects in those tables.

Having a high watermark of RangePartitions several times the number of partition servers 252 (e.g., a storage stamp 102 has a few hundred partition servers 151) can be chosen based on how big to allow the stream and extent metadata to grow for the stream manager 200, and still completely fit the metadata in the memory for the stream manager 200. Keeping many more RangePartitions than partition servers 252 enables the system to quickly distribute a failed partition server or rack's load across many other partition servers 252. A given partition server 252 can end up serving a single extremely hot RangePartition, tens of lightly loaded RangePartitions, or a mixture in between, depending upon the current load to the RangePartitions in the storage stamp 102. The number of RangePartitions for the Blob Table vs. Entity Table vs. Message Table depends upon the load on the objects in those tables and is continuously changing within a storage stamp 102 based upon traffic.

The load balancing operation is now described in detail. The system tracks the load for each RangePartition as well as the overall load for each partition server 252. For both of these the system tracks (a) transactions/second, (b) average pending transaction count, (c) throttling rate, (d) central processing unit (CPU) usage, (e) network usage, (f) request latency, and (g) data size of the RangePartition. The partition manager 250 maintains heartbeats with each partition server 252. This information is passed back to the partition manager 250 in responses to the heartbeats. If the partition manager 250 detects a RangePartition that has too much load based upon load metrics 318, then the partition manager 250 decides to split the partition and sends a command to partition server 252 to perform the split. If instead a partition server 252 has too much load, but no individual RangePartition seems to be too highly loaded, the partition manager 250 takes one or more RangePartitions from the partition server 252 and reassigns them to a more lightly loaded partition server 252.

To load balance a RangePartition, the partition manager 250 sends an offload command to the partition server 252, which will have the RangePartition write a current checkpoint before offloading it. Once complete, the partition server 252 acknowledges back to the partition manager 250 that the offload is done. The partition manager 250 then assigns the RangePartition to its new partition server 252 and updates the Partition Map Table 254 to point to the new partition server 252. The new partition server 252 loads and starts serving traffic for the RangePartition. The loading of the RangePartition on the new partition server 252 is very quick since the commit log is small due to the checkpoint prior to the offload.

The split operation is now described in detail. The cloud storage system (CSS) 100 splits a RangePartition due to too much load as well as the size of its row or blob data streams. If the partition manager 250 identifies either situation, it informs the partition server 252 serving the RangePartition to split based upon load or size. The partition manager 250 makes the decision to split, but the partition server 252 chooses the key (AccountName, PartitionName) where the partition will be split.

To split based upon size, the RangePartition maintains the total size of the objects in the partition and the split key values where the partition can be approximately halved in size, and the partition server 252 uses that to pick the key for where to split. If the split is based on load, the partition server 252 chooses the key based upon Adaptive Range Profiling 320. The partition server 252 adaptively tracks which key ranges in a RangePartition have the most load and uses this to determine on what key to split the Range Partition.

To split a RangePartition (B) into two new RangePartitions (C,D), the following steps are taken. 1) The partition manager 250 instructs the partition server 252 to split B into C and D. 2) The partition server 252 in charge of B checkpoints B, then stops serving traffic briefly during step 3 below. 3) The partition server 252 uses a special stream operation MultiModify to take each of B's streams (metadata, commit log and data) and creates new sets of streams for C and D respectively with the same extents in the same order as in B. This step is very fast since a stream is just a list of pointers to extents. The partition server 252 then appends the new partition key ranges for C and D to their metadata streams.

4) The partition server 252 starts serving requests to the two new partitions C and D for their respective disjoint PartitionName ranges. 5) The partition server 252 notifies the partition manager 250 of the split completion, and the partition manager 250 updates the Partition Map Table 254 and its metadata information accordingly. The partition manager 250 then moves one of the split partitions to a different partition server 252.

The merge operation is now described in detail. To merge two RangePartitions, the partition manager 250 will choose two RangePartitions C and D with adjacent PartitionName ranges that have low traffic. The following steps are taken to merge C and D into a new RangePartition E. 1) The partition manager 250 moves C and D so that they are served by the same partition server 252. The partition manager 250 then tells the PS to merge (C,D) into E. 2) The partition server 252 performs a checkpoint for both C and D, and then briefly pauses traffic to C and D during step 3. 3) The partition server 252 uses the MultiModify stream command to create a new commit log and data streams for E. Each of these streams is the concatenation of all of the extents from their respective streams in C and D. This merge means that the extents in the new commit log stream 304 for E will be all of C's extents in the order they were in C's commit log stream 304 followed by all of D's extents in their original order. This layout is the same for the new row and Blob data stream(s) for E.

4) The partition server 252 constructs the metadata stream for E, which contains the names of the new commit log and data stream, the combined key range for E, and pointers (extent+offset) for the start and end of the commit log regions in E's commit log derived from C and D, as well as the root of the data index in E's data streams. 5) At this point, the new metadata stream for E can be correctly loaded, and the partition server 252 starts serving the newly merged RangePartition E. 6) The partition manager 250 then updates the Partition Map Table 254 and its metadata information to reflect the merge.

The partition layer inter-stamp replication is now described in detail. In FIG. 6, an AccountName is associated (via DNS) to a single location and a storage stamp 102, where all data access goes to that storage stamp 102. This storage stamp 102 is called the primary stamp (e.g., storage stamp 102-1) for an account. An account actually has one or more secondary storage stamps 102 (e.g., storage stamp 102-2) assigned to it by the location service 104. The information about the primary/secondary storage stamps (e.g., storage stamps 102-1, 102-2) indicates to the cloud storage system (CSS) 100 to perform inter-stamp replication for this account from the primary storage stamp to the secondary storage stamp(s) (e.g., from storage stamp 102-1 to storage stamp 102-2).

One scenario for inter-stamp replication is to geo-replicate an account's data between two datacenters 14 for disaster recovery. In this scenario, a primary and secondary location is chosen for the account. For example, consider an account for which a primary stamp (P) (e.g., storage stamp 102-1) is to be located in US South and a secondary stamp (S) (e.g., storage stamp 102-2) is to be located in US North.

When provisioning the account, the location service 104 will choose a storage stamp 102 in each location and register the AccountName with both storage stamps 102 such that the storage stamp (P) in US South accepts live traffic and the storage stamp (S) in US North will accept only inter-stamp replication (also called geo-replication) traffic from the storage stamp P for the account. The location service 104 updates the DNS 106 to have hostname AccountName.service.core.windows.net point to the storage stamp P's VIP (e.g., VIP 110-1) in US South.

When a write request is received at the storage stamp P for the account, the change is fully replicated within that storage stamp using intra-stamp replication at the stream layer 112, and then success is returned to the client. After the update has been committed in the storage stamp P, the partition layer 114 in the storage stamp P will asynchronously geo-replicate the change to the secondary storage stamp S using inter-stamp replication. When the change arrives at the storage stamp S, the transaction is applied in the partition layer 114, and this update fully replicates using intra-stamp replication within the storage stamp S.

Since the inter-stamp replication is done asynchronously, recent updates that have not been inter-stamp replicated can be lost in the event of disaster. In production, changes are geo-replicated and committed on the secondary storage stamp S within seconds (e.g., 30 seconds) on average after the update was committed on the primary storage stamp P.

Inter-stamp replication is used for both account geo-replication and migration across storage stamps 102. For disaster recovery, an abrupt failover may be performed where recent changes may be lost, but for migration a clean failover is performed so there is no data loss. In both failover scenarios, the location service 104 makes an active secondary storage stamp S for the account the new primary storage stamp and switches the DNS 106 to point to the secondary storage stamp's VIP (e.g., VIP 110-2). The URI used to access the object does not change after failover. This allows the existing URIs used to access Blobs, Tables and Queues to continue to work seamlessly after failover.

Throughout the present disclosure, two types of metadata are referenced: Application metadata and System metadata. Application metadata is metadata created as a function of the application software used to create a document or file. This includes information about the document itself, the author, comments, and prior edits. Some application metadata includes when the document was created, viewed, modified, saved, or printed. The application metadata is part of the software file itself, and does not change but moves with the file.

System metadata is information created by a computer's operating system or by the user and is maintained by the operating system. For example, this information indicates a file's location, or path in storage, and the time and date stamps indicating when the file was created, opened or changed. System metadata is not part of the data file itself, and may be on a different part of a disk than application metadata. System metadata might be changed by different software installed on a computer. Here, the system metadata is information created by the cloud storage system (CSS) 100 regarding the storage of data in the stream layer 112 and is generally kept in the Object Tables in the partition layer 114.

The data encryption provided by the cloud storage system (CSS) 100 using the above architecture is now described in detail. In brief, the CSS 100 provides encryption for data at rest to protect and safeguard data to meet organizational security and compliance commitments. With this feature, the CSS 100 automatically encrypts data prior to persisting to storage and decrypts prior to retrieval. The encryption, decryption, and key management are totally transparent to users. The CSS 100 provides a comprehensive set of security capabilities which together enable developers to build secure applications. Data can be secured in transit between an application and Azure by using client side encryption, HTTPs, or SMB 3.0. The CSS 100 provides encryption at rest, handling encryption, decryption, and key management in a totally transparent fashion. All data is encrypted using 256-bit Advanced Encryption Standard (AES) encryption, which is one of the strongest block ciphers available.

A brief description of the encryption/decryption workflow follows. The customer enables encryption on the storage account via the portal 20 (see FIG. 3). When the customer writes new data (PUT Blob, PUT Block, PUT Page, PUT File etc.) to Blob or File storage; every write is encrypted using 256-bit AES encryption, one of the strongest block ciphers available. When the customer needs to access data (GET Blob, etc.), data is automatically decrypted before returning to the user. If encryption is disabled, new writes are no longer encrypted and existing encrypted data remains encrypted until rewritten by the user. While encryption is enabled, writes to Blob or File storage will be encrypted. The state of data does not change with the user toggling between enabling/disabling encryption for the storage account. All encryption keys are stored, encrypted, and managed by cloud provider.

The cloud storage system (CSS) 100 includes the following encryption features. The CSS 100 compresses and encrypts large amounts of data upfront at the front end layer 116 of the CSS 100 as described below in further detail. Compressing and encrypting data upfront reduces the latency that is normally associated with encrypting and storing the data. Additionally, encrypting data upfront significantly reduces the latency that is normally associated with data transfers that occur downstream in the CSS 100 as well as data transfers that occur across clusters 34 and datacenters 14 as explained blow. Further, the CSS 100 allows users to turn encryption on or off dynamically and to track encryption status of the data as explained below.

In the cloud storage system (CSS) 100, encryption at rest provides data security when stored on physical disks in the storage stamps 102. When enabled, all user data and application metadata is be encrypted at the front end layer 116 using an encryption algorithm such as, for example, AES-256. Any other encryption algorithm can be used instead. To determine which algorithm to use for decryption, the algorithm used to encrypt the data is tracked in the data header next to the encrypted block. Encryption is enabled at the account level, whereby the account is supplied with a single key used for encryption (the account encryption key). This key can be generated and managed by XStore 30 (see FIG. 3); however, the CSS 100 allows this key to be managed by Key Vault and even users. In user managed cases, once set, this key is not changed. For XStore managed keys, the key can be rotated. Older keys are stored, and newer data can be encrypted with a new key.

During encryption, each block of data is encrypted with a unique derived data key that is generated from the account encryption key and a random seed GUID using a key derivation function (KDF). The seed is stored in each block of data, and is used in decryption to recover the data key. So actual encryption keys are not persisted to disk. The account encryption keys are also encrypted using a master stamp key when persisting to disk, for security compliance.

The key hierarchy is as follows. A Master Encryption Key is used to encrypt level 2 account encryption keys. An Account Encryption Key is used to generate level 3 data encryption keys. Data Encryption Keys are actual keys used to encrypt user data, and are generated by KDF (accountKey, seed), where seed is a randomly generated GUID.

In the cloud storage system (CSS) 100, encryption at rest is managed at the account level. There are two settings users can control: turning encryption on/off, and the encryption key provider. Turning encryption on/off is at the service level. The encryption key provider specifies who is responsible for providing the account's encryption key (e.g., the user or the cloud provider). The same provider/account encryption key is used for all services that have encryption enabled.

Key management by XStore in the cloud storage system (CSS) 100 is now explained. When an account turns on encryption for the first time, the CSS 100 generates a new 256-bit secret key with name encryption-1, for example. This is a completely internal key that is used only for data. This key is generated and stored as part of the account's secret key list because secret keys already possess the properties needed for the encryption key. Secret keys also support rotation of the key used to encrypt them on disk (the master encryption key described above), which is also needed for the encryption key. The CSS 100 does not re-generate the encryption-1 key although encryption can be turned on and off. The encryption-1 key is preserved once encryption is turned on since data may still be stored in encrypted form even after encryption is turned off.

When Key Vault and user-provided keys are used, only one provider is allowed at a time, although the user may be able to switch between them. For Key Vault, the CSS 100 uses a single key for an account. Once set, the key may be rotated but not changed. The distinction is that a rotation of the key only updates the version of the key, whereas a key swap means a new key name entirely. The version of the key is stored with each data block. To decrypt, the CSS 100 first queries each block for the key version, gets the full key URL to retrieve the encryption key (either cached or from Key Vault), before decrypting the data.

For user managed keys, the keys are provided at the request level instead of account level. The user provides the key to encrypt on each write when the user wants to have data encrypted. The CSS 100 stores a signature of the key with that data, to verify the same key is provided during read/decryption. The CSS 100 allows users to discover what ranges of each blob is encrypted with which key.

The server side encryption in the cloud storage system (CSS) 100 is now explained. First, the XStore managed server side encryption is explained. Then the key vault managed and the user managed server side encryption is explained.

In the XStore managed server side encryption in the CSS 100, XStore controls the entire server-side encryption workflow, including encryption keys. At a high level, data encryption and decryption occurs at the front end layer 116, with the stream layer 112 performing the actual encryption/decryption.

To track whether a blob is encrypted, two blob flags are added on a partition server 252, one flag to track the data and another to track the metadata. For block blob, the data flag is set to true if every block in the commit list is encrypted. For a page blob, the data flag is kept true if every single write is encrypted. During reads, the CSS 100 determines that the blob is encrypted if both data and metadata flags are set. For containers, just the metadata flag is sufficient.

During writes, the data is first compressed and then encrypted on front end layer 116, then sent to a partition server 252, where it will get committed to disk. Previously compression occurred on a partition server 252 right before commit. The cloud storage system (CSS) 100 moves the compression up before encryption to maximize the space reduction, and since otherwise compressing encrypted data will not yield much if any size savings. The CSS 100 performs compression and encryption at the front end layer 116 instead of in the partition layer 114 because the front end layer 116 handles account encryption keys wherever possible, without introducing the complexities in the partition layer 114. To keep the workflow consistent, unencrypted writes (when encryption is not enabled) are also compressed at the front end layer 116, so that the partition layer 114 just commits data as-is. This design of the CSS 100 provides some additional network savings between the front end layer 116 and the partition layer 114.

The following is a summary of the workflow on the front end layer 116. 1) User passes data and application metadata. 2) The front end layer 116 gets the account encryption key (by getting the encryption-1 key), or NULL (if encryption is not enabled). 3) The front end layer 116 gives account encryption key and data and application metadata to Stream ClientLib. ClientLib compresses and encrypts the data and returns the compressed and encrypted data (called rawData) that is eventually written to disk. 3a) If the key is NULL, encryption is a no-op, and data is just compressed (this is the unencrypted case). 3b) ClientLib generates a random GUID to use as seed, and along with account encryption key, derives a data key used to encrypt. 3c) For PutPage operation, this call is made once for every 64 KB of user data. For PutBlock/AppendBlock operation, this call is made once to encrypt up to 4 MB of user data. For PutBlob operation, this call is made once for every 4 MB chunk. 3d) Application metadata is another call, only if encryption is required. 4) The front end layer 116 passes the raw data (i.e., the compressed and encrypted data in the encrypted case or the compressed data in the unencrypted case) to the partition layer 114, using either new method calls or new commands to indicate the new data format. The raw data is written to disk in the stream layer 112.

At the time of decryption, during reads, the front end layer 116 gets the blob BlockMetadata from the partition layer 114, and then uses it along with the account encryption key to read the data from the stream layer 112. If parts of a blob are unencrypted, calling the read stream API with the encryption key will be a no-op and the front end layer 116 still gets the original data back. An additional stream call per block is used to query for the key name so that the front end layer 116 can get the correct key to read the data. For metadata, a Stream API call is made to decrypt metadata if the metadata encrypted flag is set.

The cloud storage system (CSS) 100 also supports encrypting table dictionary columns, queue messages, and files (and all the container level application metadata). These data are encrypted in the same way described above, using KDF with account encryption key and seed GUID. Decryption for queues and files is similar to blob. For tables, the front end layer 116 passes the account encryption key and have the partition layer 114 perform the decryption. The reason for this is because table queries usually require filtering on dictionary columns. So the partition layer 114 needs to be able to read the decrypted data to determine which rows to return.

In the key vault managed server side encryption in the cloud storage system (CSS) 100, the account encryption key is managed by Key Vault. Everything else remains the same as in the XStore management described above, except that a Key Vault key replaces the XStore encryption-1 key. A Key Vault key is of the following form: https://{keyvault}.vault.azure.net/keys/{key-name}/{key-version}. The key vault managed server side encryption supports one key-name per account. Key rotation is allowed, which just changes key-version, but does not allow key-name to change.

Internally, the cloud storage system (CSS) 100 stores the key URL up to key-name as a ServiceMetadata field in an account row. The key-version is stored with each block that is written to disk. The CSS 100 service periodically queries the Key Vault to use the most current version of the key when doing encryption. During decryption, the front end layer 116 reads the key-version of each block to construct the exact key name, and then queries the Key Vault if necessary to get the key to use for decryption. The CSS 100 can cache these keys for performance.

In the user managed server side encryption in the cloud storage system (CSS) 100, the CSS 100 also allows users to provide their own encryption keys. Unlike XStore or Key Vault managed encryption keys, the user managed keys are not set at the account level, but at individual requests. If the user wishes to have a particular piece of data encrypted, the user provides the key as part of the request, which is HTTPS. The CSS 100 can encrypt the data with that key, and also store a signature of the key to compare during decryption. For decryption, the user provides the same key. As the CSS 100 streams back the data for each block, the CSS 100 verifies that the signature from the read request matches the stored signature. This means that if parts of a blob are encrypted with different keys, and the user tries to read across both chunks providing only one key, the CSS 100 has to abort the request in the middle.

To help users figure out which parts of each blob is encrypted with which key, the CSS 100 provides a new REST API to query the encryption key used for metadata and data ranges. For each range, the CSS 100 can return whether the metadata and data are encrypted, and if so also return the client key signature (or, for example, last K digits of signature).

The design of the partition layer 114 and its interaction with the front end layer 116 and the stream layer 112 for supporting Encryption at Rest feature in XStore are now described. The XStream client library provides support for encryption and decryption of user data. This is achieved through the following data conversion APIs used by the front end layer 116 and the partition layer 114.

As mentioned before, encryption is enabled at the account level such that all new writes are encrypted using a single account encryption key. The actual key for encrypting the data is generated using the account key and random GUID (as the salt) using a key derivation function (KDF). The salt (non-secret value) randomizes the output keys such that the consecutive encrypted blocks appear random. A data conversion API (to convert original data into encrypted raw data) generates the data encryption key.

Since encryption can be dynamically enabled and disabled, there are two forms of data for the stream layer 112: 1) Original data (i.e., uncompressed and unencrypted user data) and 2) Raw data—over-wire/on-disk data format (compressed data or compressed+encrypted data). The original data is either user data or higher layer data in its original format (uncompressed and non-encrypted). Raw data is the data transformed by the stream layer 112, including compression, encryption, adding header/cyclic redundancy check (CRC), etc. A client structure CS_RAWDATA_INFO holds the raw data and has other metadata information such as total original data length and append block count that needs to be preserved.

The front end layer 116 uses the following two APIs to convert data between these two formats. The two APIs are mirror images of each other. A first stream API is called CsConvertOriginalDataToRawData. The first stream API Converts original data into raw data (compressed+encrypted+header+CRC) in the form of CS_RAW-DATA_INFO structure. The input can be multiple append blocks. Note that encryption is optional. If the encryption key passed in as the input is NULL (unencrypted case), raw data returned is of type (compressed+header+CRC). A second stream API is called CsConvertRawDataToOrignalData and converts raw data to original data.

The raw data returned by data transformation API of form CS_RAWDATA_INFO also includes metadata such as: 1) Original data Size; 2) data format info—Flag indicating the current on-disk data format; 2a) Raw data without encryption OR 2b) Raw data with encryption; 3) CRCs of the original data and encrypted data; 4) Encryption Info—Key Version, Algorithm ID, salt etc.; 5) Raw Data in the form of PCCS_MEMORY_RANGE.

In case of block blobs, when a user uploads a block to a blob, the block data is transformed by the front end layer 116 into the form CS_RAWDATA_INFO using XStream client library API CsConvertOriginalDataToRawData. If encryption is enabled, an encryption key is used in the data conversion API. The transformed data block in the form of CS_RAWDATA_INFO is sent to the partition layer 114, which is appended to blob log stream and tracked in the uncommitted list of blocks for this blob, until the time the blob is committed to disk.

When the user reads or downloads a blob, the front end layer 116 does not need the information from the partition layer 114 whether a block is encrypted or not. The front end layer 116 can use the stream raw read API to read from the stream that may have both encrypted and unencrypted append blocks. The CS_RAWDATA_INFO structure has the encryption info such as encryption algorithm, salt, key version, etc., which the front end layer 116 uses to fetch the encryption key data. The front end layer 116 then uses the data conversion API by passing the CS_ENCRYPTION_KEY populated using details obtained for converting the raw data to original data format.

The encryption policy set on the account indicates whether the new writes will be encrypted or not. Existing data is left unencrypted. The reverse is true when the encryption is turned off; the existing data remains encrypted, and the new writes will not be encrypted. At any point in time, the user can query if all of the committed blocks of the blob are encrypted or not.

To support the scenario where a blob can contain both encrypted and unencrypted blocks, the cloud storage system (CSS) 100 tracks the encryption status per block in both a Temporary Block List (TBL) and a Committed Block List (CBL). A bit is added to the blob flags which indicates if all the committed blocks of the blob are encrypted or not at the current time. A GetBlobProperties API retrieves the encryption status of the blob by inspecting the blob flag encryption bit when the response is returned back to the user. The blob flag bit for encryption is updated when the CBL is prepared, i.e., whenever the blob is committed (PutBlob command or PutBlockList or append blob) by inspecting the encryption status of each block belonging to this blob. Hence, the blob flag bit denotes the encryption status of the committed version of the blob.

The CBL and TBL also include the individual block CRCs. Since the cloud storage system (CSS) 100 transforms the data at the front end layer 116 (whether encryption is enabled or not), CRCs returned in raw data CS_RAW-DATA_INFO are persisted in CBL and TBL for each block. If the data block was encrypted, the CSS 100 persists the CRC generated post encryption; otherwise, the CRC of the original data (also available in CS_RAWDATA_INFO) is persisted.

The blob's application metadata is also encrypted by the front end layer 116 and the transformed data is persisted by the partition layer 114. So the CSS 100 tracks the encryption status using one of the bits in the blob flags. The front end layer 116 uses a method call FLAG_SET_BIT to set bit for application metadata encryption status in the blob flags. The CSS 100 supports the case where a blob is in a mixed state (partially encrypted) so that customers can continue to use the old blobs whenever the account encryption status changes.

Similar to Block Blobs, a page blob may have a mix of encrypted and unencrypted pages if users continue to add/update pages in an existing blob (blob that was created prior to encryption policy changes to the account). In case of Block blobs, the CSS 100 tracks the encryption status for the committed version of the blocks in the blob in the blob flags. This blob flag is updated when CBL is prepared. However, in case of page blobs, the CSS 100 uses the blob flag with encryptions status for determining if the blob never had an unencrypted write. Users can query if their blob was ever in an unencrypted status through a GetBlobProperties API and overwrite the entire blob if needed to completely encrypt the blob later.

The blob encryption status bit is set during the PutBlob command. Every InsertPage command checks if the page data is encrypted or not and if unencrypted the encryption status bit is cleared. The status bit remains enabled or changes from 1 to 0 (if there is at least one unencrypted bit detected, although the page may have been overwritten), but it does not change from 0 to 1 during InsertPage requests. However, users can overwrite the entire blob (copy blob or promote snapshot), which updates the status bit as that of the source blob.

Similar to Block Blobs, the CSS 100 does not track if a given data page is encrypted or not. This tracking is needed so that the garbage collector knows if the page data read during rewrites is encrypted or not, and depending on the encryption status, the garbage collector will populate the appropriate members in the CsAppendStreamEx. Note that the blob's application metadata will also be encrypted by the front end layer 116 and that the transformed data will be persisted by the partition layer 114. So the CSS 100 tracks the encryption status using one of the bits in the blob flags.

The garbage collector (i.e., defragmenter) implemented by the cloud storage system (CSS) 100 is now described in detail. While the description uses a block blob for illustration only, the description applies to garbage collection (i.e., defragmenting) of Page Blobs and other types of data objects. The garbage collector (i.e., defragmenter) is implemented in the partition layer 114 of the CSS 100.

For defragmenting an extent in a blob stream, block blob and page blob garbage collector identifies active regions (i.e., blocks and BlobHeaders that are still in use for block blobs, valid pages for page blobs) and free regions (i.e., regions that have been deleted, expired, or from failed operations). The garbage collector then finds extents with large free regions, and moves the valid data in the old extent to a new extent. This allows the old extent to then be freed and thus reclaiming storage space.

When the garbage collector decides to rewrite data, the garbage collector uses the CsReadStreamEx API to read the data. This API internally decompresses the data and returns the original data along with the data block's/Page's CRC. The garbage collector then constructs the Append Blocks using the decompressed data and uses it in the CsAppendStreamEx API, which internally compresses the data and stores it on disk. The garbage collector later saves this CRC in the blob header or Page range row.

The decompression and compression for every data block (or data page) rewrite is unnecessary and can be avoided by configuring the garbage collector to read the data in the raw format using the CsReadStreamRawData( ) API and using the same raw data to write back to the stream.

When Block Blob garbage collector decides to rewrite a block, the target block could have been created as one of the following three cases. 1) Block created with old PutBlock command; 2) Block created with new PutBlock command (or method call) with raw data input (without encryption) sent by the front end layer 116; 3) Block created with new PutBlock command (or method call) with raw data input (with encryption) sent by the front end layer 116. For the first two cases, CRC of the original data is stored in CBL. For case (3), CRC of the encrypted raw data is stored in CBL. Note that the garbage collector does not rewrite TBL blocks.

The garbage collector uses the CsReadStreamRawData( ) API to read a data block. The API output CS_RAWDATA_INFO is used for writing the data back to the data stream by passing it to the CsAppendStreamEx( ) API. Once the append operation is successful, the garbage collector prepares a new blob header and updates the blob row. The output CS_RAWDATA_INFO of the CsReadStreamRawData( ) API includes information indicating if the data is encrypted or not. If the data is not encrypted, the garbage collector uses the CRC of the original data or encrypted data's CRC (present in CS_RAWDATA_INFO), prepares blob header with this CRC for the current block, and updates the blob row with the new blob header position.

Additional features of the garbage collector include encrypting the unencrypted data from before encryption is turned on for the first time, encrypting the unencrypted data from in between turning on and off of encryption, and/or encrypting the unencrypted data regardless of whether encryption is turned on at all. These and other features of the garbage collector are described below in detail with reference to FIGS. 17 and 18.

Various methods implemented by the cloud storage system (CCS) 100 shown in FIGS. 6-10 are now described. In the following description, the term control represents code or instructions executed by one or more components of the CCS 10 shown in FIGS. 3-5, by one or more components of the CSS 100 shown in FIGS. 6-10, or by one and/or more components of the distributed network system 700 shown in FIGS. 24-26 to perform the described functionality. The term control refers to one or more of the client and server applications 766 and 786 described below with reference to the distributed network system 700 shown in FIGS. 24-26, which implements the cloud computing system (CCS) 10 shown in FIGS. 3-5, the CSS 100 described above with reference to FIGS. 6-10, and the methods 400-580 described below with reference to FIGS. 11-18.

Figure 11:
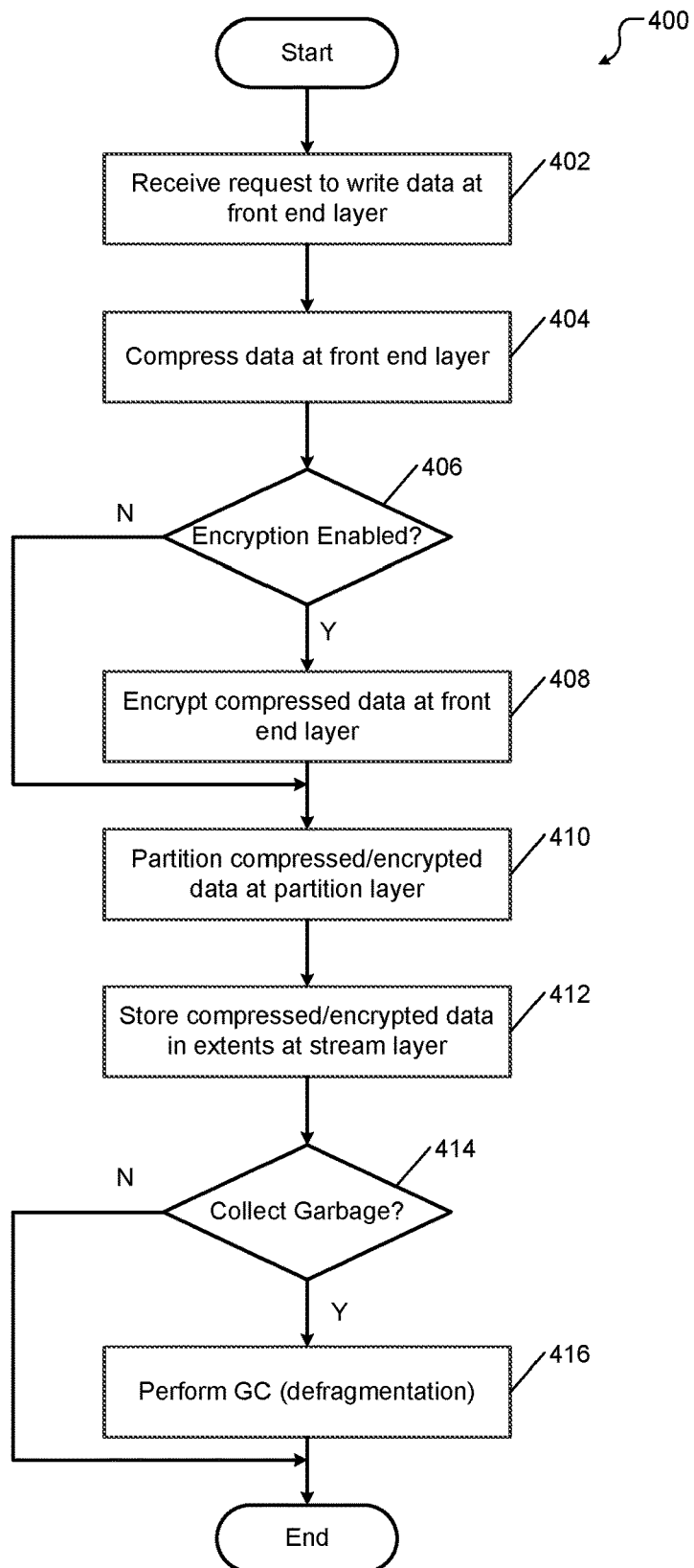
FIG. 11 is a flowchart of a method for encrypting data in a distributed storage environment such as the cloud storage system of FIG. 6.

FIG. 11 shows a method 400 for encrypting data in a distributed storage environment such as the cloud storage system (CSS) 100. At 402, control receives a request at the front end layer 116 to write data. At 404, control compresses the data at the front end layer 116. At 406, control determines whether encryption is enabled. At 408, control encrypts the compressed data at the front end layer 116 if encryption is enabled. Control embeds the encrypted data with encryption information (e.g., seed, key version, etc.) that can be utilized when decrypting the encrypted data. The seed is stored in unencrypted form and is placed in a data header associated with the encrypted data, which is stored in the stream layer 112. At 410, control partitions the compressed or encrypted data at the partition layer 114. At 412, control stores the compressed or encrypted data in extents at the stream layer 112. At 414, control determines whether to perform garbage collection (i.e., defragmentation). At 416, control performs garbage collection (i.e., defragmentation) if necessary.

Figure 12:
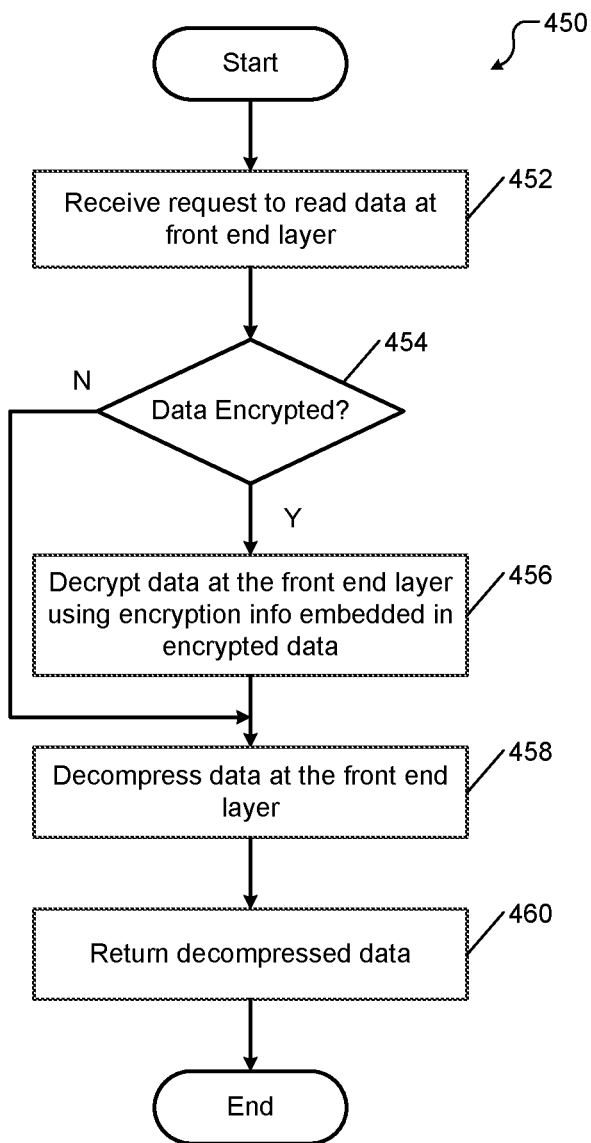
FIG. 12 is a flowchart of a method for decrypting data in a distributed storage environment such as the cloud storage system of FIG. 6.

FIG. 12 shows a method 450 for decrypting data in a distributed storage environment such as the cloud storage system (CSS) 100. At 452, control receives a request at the front end layer 116 to read data. At 454, control determines if the data is encrypted. At 456, control decrypts data at the front end layer 116 using encryption information embedded in the encrypted data if the data is encrypted. For example, to decrypt an encrypted block, control reads a data header (which is unencrypted) associated with the encrypted block, reads the seed stored unencrypted in the data header, regenerates the data decryption key using the seed, and then decrypts the encrypted data. At 458, control decompresses the data (decrypted data if the data is encrypted or compressed data if the data is not encrypted) at the front end layer 116. At 460, control returns the decompressed data.

Figure 13:
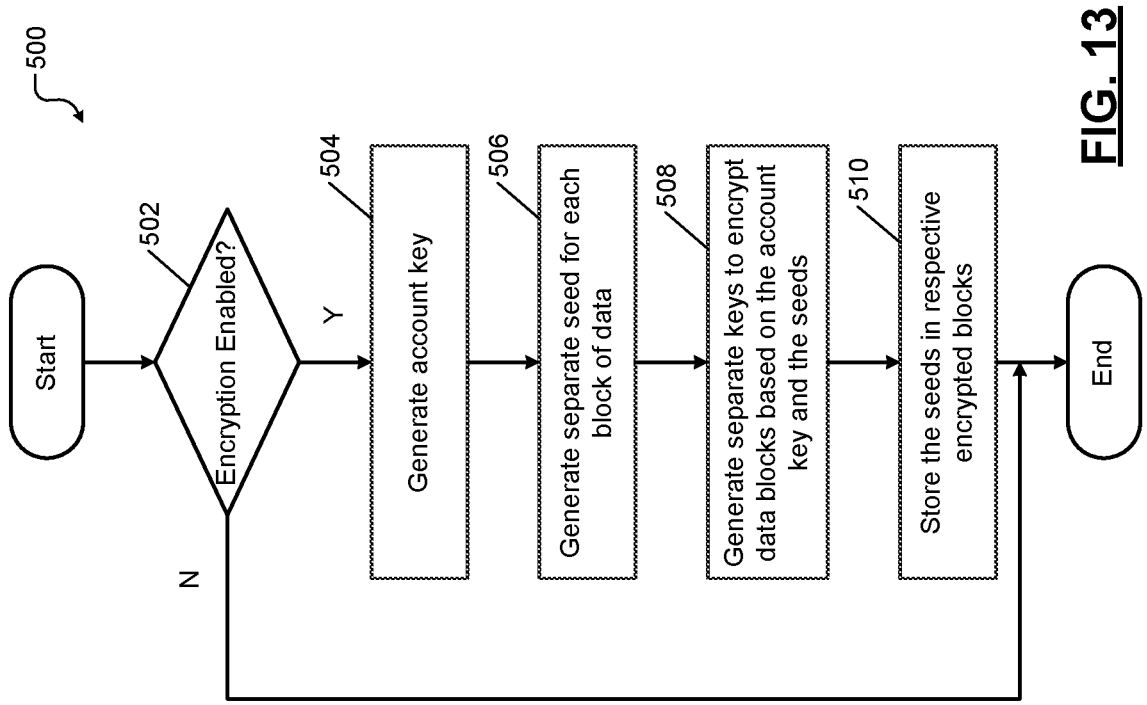
FIG. 13 is a flowchart of a method for generating keys for encrypting data in a distributed storage environment such as the cloud storage system of FIG. 6.

FIG. 13 shows a method 500 for generating keys for encrypting data in a distributed storage environment such as the cloud storage system (CSS) 100. At 502, control determines whether encryption is enabled. At 504, control generates an account key if encryption is enabled. At 506, control generates a separate (i.e., unique) seed for each block of data to be encrypted. At 508, control generates separate (i.e., unique) keys to encrypt data blocks based on the account key and the seeds. At 510, control stores the seeds in respective encrypted blocks.

Figure 14:
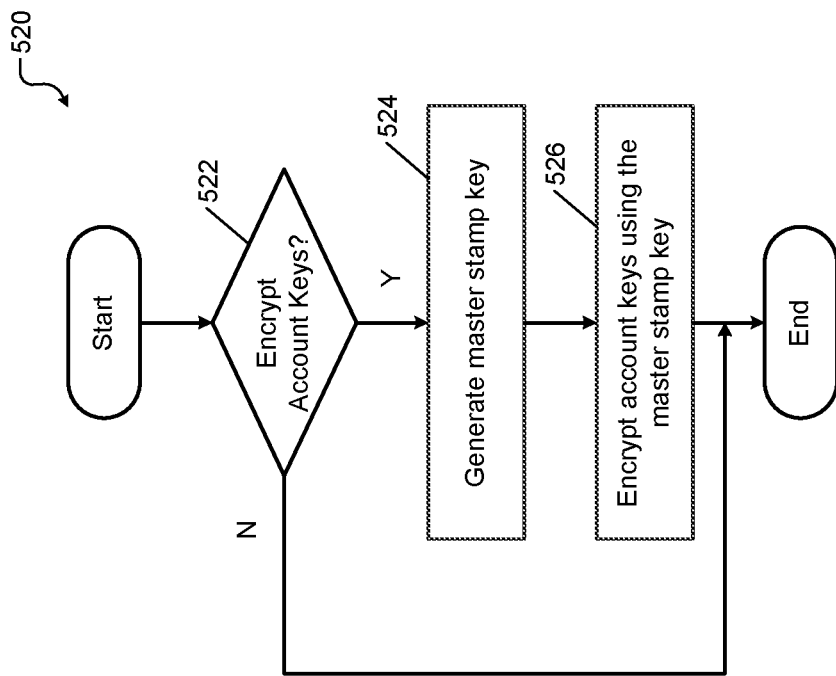
FIG. 14 is a flowchart of a method for encrypting keys used to encrypt data in a distributed storage environment such as the cloud storage system of FIG. 6.

FIG. 14 shows a method 520 for encrypting keys used to encrypt data in a distributed storage environment such as the cloud storage system (CSS) 100. At 522, control determines whether to encrypt account keys. At 524, control generates a master stamp key per storage stamp 102. At 526, control encrypts the account keys using the master stamp key.

Figure 15:
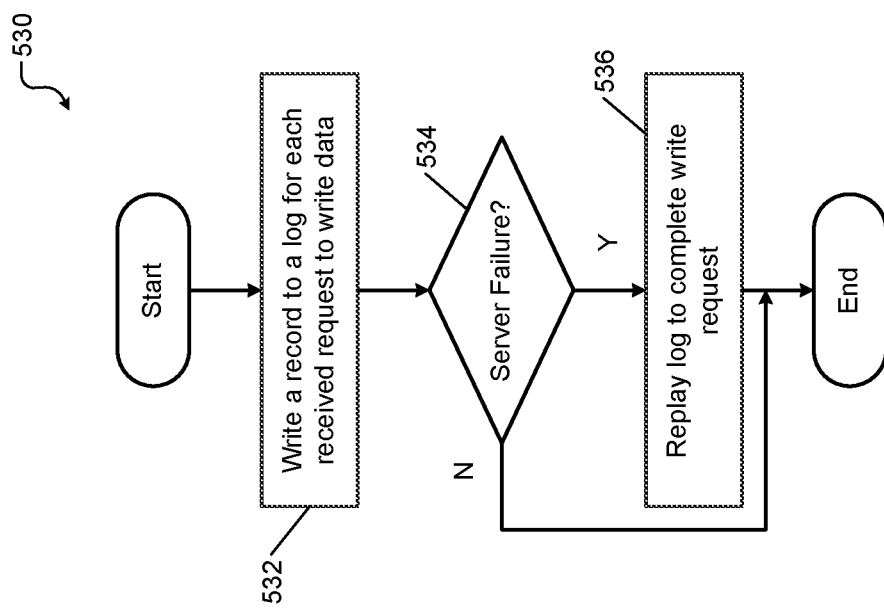
FIG. 15 is a flowchart of a method for handling server failures when writing data in a distributed storage environment such as the cloud storage system of FIG. 6.

FIG. 15 shows a method 530 for handling server failures when writing data in a distributed storage environment such as the cloud storage system (CSS) 100. At 532, control writes a record to a log for each received request to write data. This log is used for replay when a partition server crashes. The log is also replayed for geo-replication and account migration. At 534, control determines if a server failed prior to completing the write request. At 536, control replays the log to complete the write request in the event of a server failure.

Figure 16:
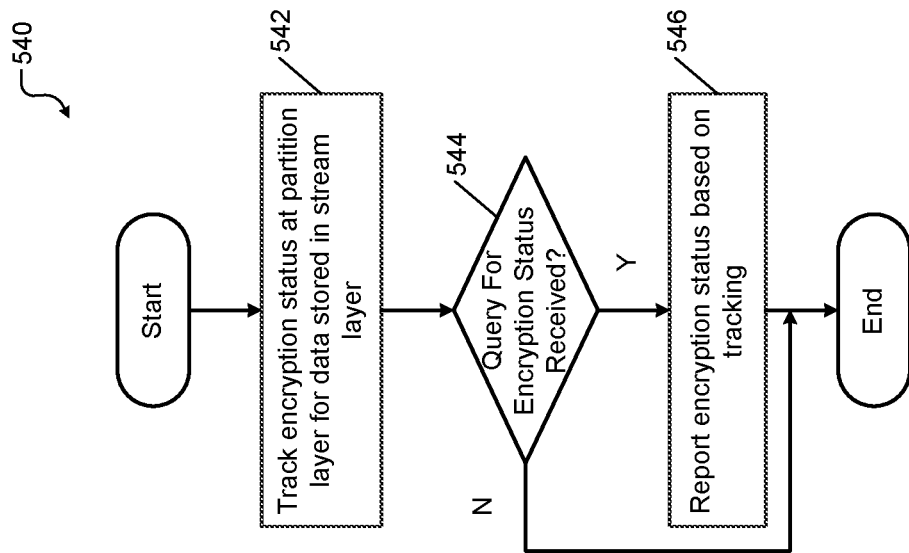
FIG. 16 is a flowchart of a method for tracking encryption status of data in a distributed storage environment such as the cloud storage system of FIG. 6.

FIG. 16 shows a method 540 for tracking encryption status of data in a distributed storage environment such as the cloud storage system (CSS) 100. At 542, control tracks encryption status of the data stored in the stream layer 116. At 544, control determines whether a query for encryption status is received. At 546, control reports the encryption status of the data based on the tracking.

Due to dynamic partitioning, there can be a situation where multiple extents are referenced by multiple partitions. The garbage collector (i.e., the defragmenter) solves this problem in two passes or phases. That is, the garbage collection (i.e., defragmentation) process includes two passes or phases. In a first pass, the garbage collector identifies the partition with most garbage. In the second pass, the data from multiple extents is rewritten to a new extent. The garbage collector encrypts the data during this second pass while the garbage collector rewrites the data from multiple extents to a new extent, and the garbage collector updates the index such that there is no downtime occurs to the users. Thus, the method of encrypting data during the garbage collection (i.e., defragmentation) process includes these two passes or phases, which are now described below in detail.

Note that while reference is made to extents and blocks throughout the present disclosure, the teachings of the present disclosure apply to any unit (or collection or grouping) of data. That is, the teachings of the present disclosure apply to any data structure or data unit used to store data. Extents and blocks referenced throughout the present disclosure are examples of data structures or data units used to store data. Accordingly, a data unit can include an extent, one or more blocks, or some other unit of data storage.

In the first pass, the garbage collector identifies the partition with most garbage as follows. The garbage collector scans all the blobs in a namespace, by going namespace by namespace. The garbage collector determines the amount of garbage or data in an extent. The garbage collector creates a global map (i.e., a full view of the extents and the occupancy thereon). The garbage collector evaluates the global map based on the number of partitions per extent. Also, the partition occupancy is compared against a threshold. But, the extents are ultimately selected by the age of the data in the extent. The user can somewhat control the encryption of new data based on the on/off control of the backend encryption process.

In the second pass, the garbage collector determines whether the extent is identified for garbage collection (defragmentation in the extents removes the holes in the data (created by deletes) once the partition is either full or identified by the GC as being ready for cleaning). The data in the extent is encrypted and rewritten to the new extent, without the user knowing and without impacting the user's ongoing operations (i.e., by piggy-backing the encryption upon the currently running age-based garbage collection). This process occurs in the lower level (partition servers). This process can encrypt the data quickly within the normal garbage-collection process (process the petabytes of data faster). Metadata is updated to ensure that the system knows where to point the new requests. In this manner, the garbage collector reclaims the space in the extent for more storage.

Figure 17:
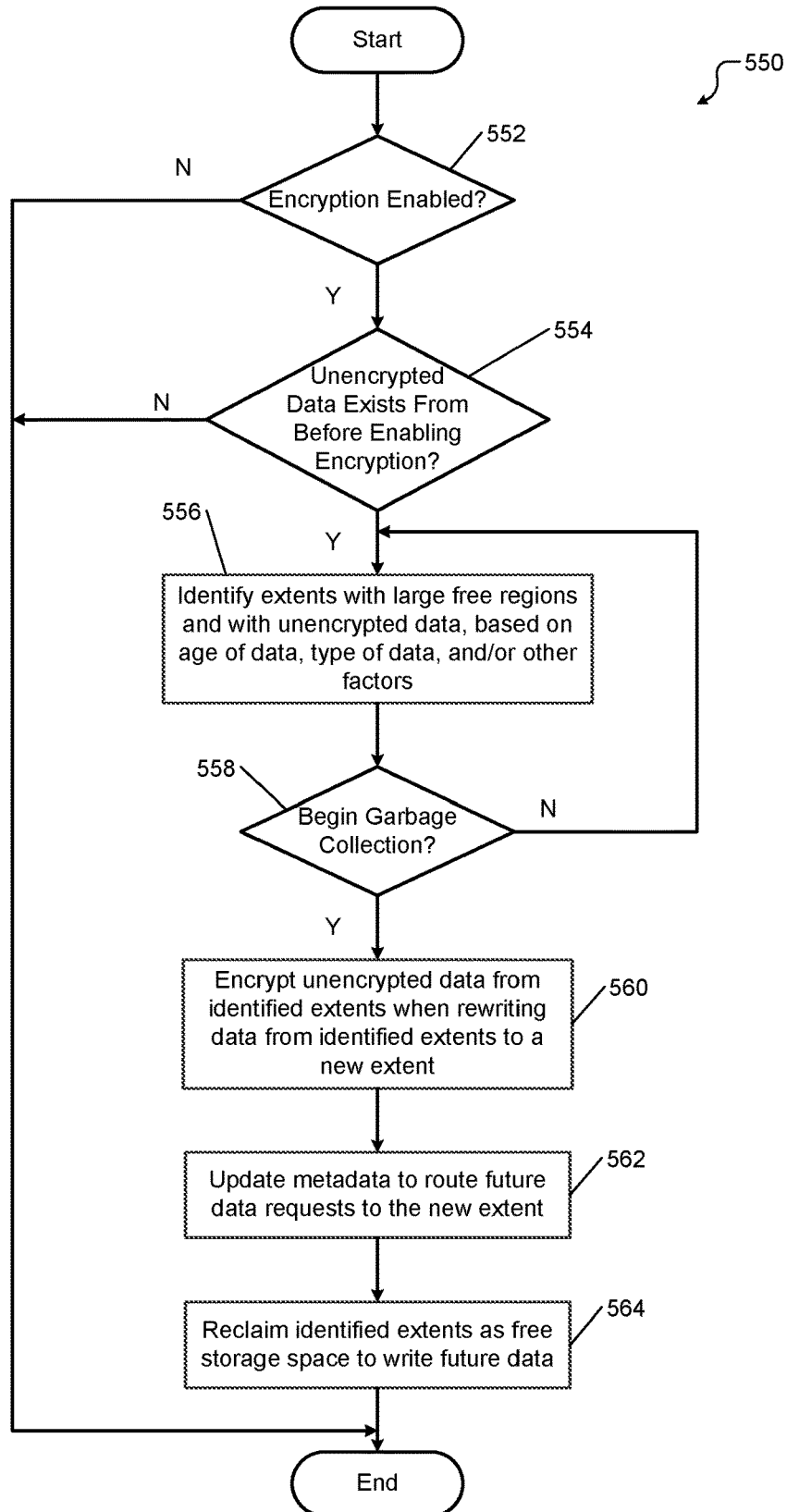

FIG. 17 shows a first method 550 for encrypting unencrypted data while rewriting data during garbage collection (i.e., while performing defragmentation) in a distributed storage environment such as the cloud storage system (CSS) 100. The method 550 can be turned on and off when encryption is turned on and off as described above with reference to FIGS. 11-16.

At 552, control determines whether encryption is enabled. If the encryption is enabled, data is encrypted as described above with reference to FIGS. 11-16. At 554, control determines if any unencrypted data exists from before enabling encryption. For example, unencrypted data may exist if encryption is being enabled for the first time. Unencrypted data may also exist if encryption is being enabled after being previously disabled.

At 556, control identifies extents with large free regions and with unencrypted data as candidates for defragmentation or garbage collection. The identification may be based on the age of the data in the extents, the type of data in the extents, and/or other factors including but not limited to how important is the customer to whom the data belongs. For example, the data may be older than a predetermined time period that makes the data suitable for garbage collection and encryption. Further, the data may include multimedia or other type of data that makes the data suitable for encryption. The identification may also be based on an amount of data in the extents. For example, an extent with less than or equal to a predetermined amount of data may be a suitable candidate for defragmenting.

At 558, control determines whether to begin garbage collection (i.e., defragmentation) of the identified extents. For example, garbage collection may be performed periodically or depending on the volume of the identified extents.

At 560, control begins garbage collection (i.e., defragmentation) of the identified extents. Control begins rewriting data from the identified extents to one or more new extents so that the identified extents can be released as freed up extents that are now available for storing fresh data. Control encrypts any unencrypted data present in the identified extents while rewriting the data from the identified extents to one or more new extents. To encrypt the unencrypted data, control uses the keys generated as described above with reference to FIGS. 11-16.

At 562, control updates the metadata of the extents so that requests for data that was previously stored in the identified extents and that is now stored in the new extents can be routed to the new extents. At 564, control reclaims and releases the identified extents as free storage space where new data can be written in the future.

Figure 18:
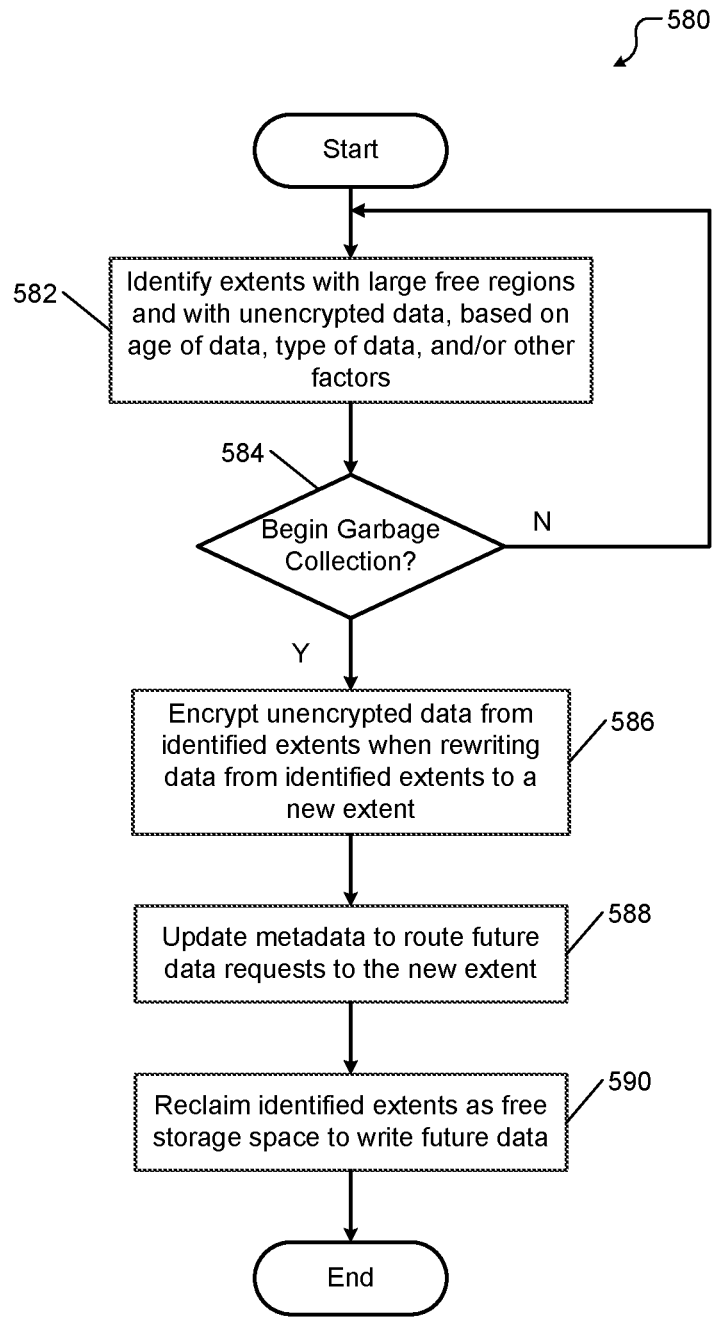

FIG. 18 shows a second method 580 for encrypting unencrypted data while rewriting data during garbage collection (i.e., while performing defragmentation) in a distributed storage environment such as the cloud storage system (CSS) 100. The method 580 is performed regardless of whether encryption is turned on as described above with reference to FIGS. 11-16.

At 582, control identifies extents with large free regions and with unencrypted data as candidates for defragmentation or garbage collection. The identification may be based on the age of the data in the extents, the type of data in the extents, and/or other factors including but not limited to how important is the customer to whom the data belongs. For example, the data may be older than a predetermined time period that makes the data suitable for garbage collection and encryption. Further, the data may include multimedia or other type of data that makes the data suitable for encryption. The identification may also be based on an amount of data in the extents. For example, an extent with less than or equal to a predetermined amount of data may be a suitable candidate for defragmenting.

At 584, control determines whether to begin garbage collection (i.e., defragmentation) of the identified extents. For example, garbage collection may be performed periodically or depending on the volume of the identified extents.

At 586, control begins garbage collection (i.e., defragmentation) of the identified extents. Control begins rewriting data from the identified extents to one or more new extents so that the identified extents can be released as freed up extents that are now available for storing fresh data. Control encrypts any unencrypted data present in the identified extents while rewriting the data from the identified extents to one or more new extents. To encrypt the unencrypted data, control uses the keys generated as described above with reference to FIGS. 11-16.

At 588, control updates the metadata of the extents so that requests for data that was previously stored in the identified extents and that is now stored in the new extents can be routed to the new extents. At 590, control reclaims and releases the identified extents as free storage space where new data can be written in the future.

Broadly speaking, the systems and methods of the present disclosure can be used to encrypt data while defragmenting any storage system or device. That is, encryption can be piggybacked on any defragmenting system used in any storage device. The encryption can be totally transparent to the user since the encrypted data is decrypted and returned to the user in the same form or format in which the user provides it to the storage system.

In general, a defragmenting system can identify portions of a storage device that need to be defragmented. The identification can be based on criteria such as the age of the data, the type of data, the importance of the customer in a multiuser system, and so on. For example, portions or regions of a storage device containing data older than a predetermined amount of time may be selected for defragmentation. The selection can also be based on whether the data includes multimedia or other type of data. Data of some users may be given priority over other users and may be selected.

The defragmenting system transfers (moves) and writes the data selected in the above manner from a first portion or region of the storage device to a second portion or region of the storage device. The data in the first portion or region of the storage device may be unencrypted or may include unencrypted data. When the data from the first portion is written to the second portion, the unencrypted data being written is encrypted while being written to the second portion during the defragmentation.

The systems and methods of the present disclosure encrypt system metadata and a portion of associated data referenced by the system metadata (data for tables and queues). Specifically, the systems and methods of the present disclosure encrypt the system metadata that the distributed storage system such as the CCS 100 generates for storing data of all four types (blobs, tables, queues, and files) in clusters 34 across datacenters 14. The systems and methods also encrypt data of two types: tables and queues.

The system metadata includes information about and for accessing data stored in the distributed storage system. Specifically, the system metadata includes partition metadata, transaction or replay log streams, memory tables (e.g., see FIG. 10), and data for tables and queues. The partition metadata includes a list of all stream names, key range, schema (indicating types of data), pointers to index and other data stored in streams, and pointers to transaction log replay information. The transaction or replay log streams include transaction metadata, data records, and commit record. The memory tables include index for blobs, tables, queues, and files.

The data referenced by the system metadata can include any of the four types of data previously described (blobs, tables, ques, and files). Further, the data can be from multiple accounts (i.e., owned by different users and customers). The present disclosure relates to compressing and encrypting the system metadata associated with the data of different types and from different sources (accounts). Additionally, the data associated with tables and queues is also compressed and encrypted.

The encryption of the system metadata and the tables and queues data can be performed using a single key. In some implementations, a separate key may be used for each type of data. In either case, no distinction is made between data belonging to different customer accounts. Accordingly, the key or keys are generated internally by the distributed storage system and are not provided by the customers.

Further, as explained below in detail, the encryption can be performed during the checkpoint process of converting the memory tables into the file tables. Additionally, unencrypted system metadata and associated data (i.e., unencrypted file tables and file table data) can be encrypted during garbage collection (defragmentation). The systems and methods are described below in detail.

The systems and methods of the present disclosure compress and encrypt the following: different types of system metadata including partition metadata; and log streams; index for blobs (block blobs, page blobs, and append blobs), tables, queues, and files; and the data for tables and queues.

Broadly speaking, tables for many users (within the same key space) are packed into a single index. The index is then compressed at some point. During the compression, the metadata and/or data is encrypted separately by class (i.e., by type). A common encryption key is created for all users in a cluster. For example, the common encryption key can be an internal stamp key that is derived as previously described. These and other features are now described in detail.

First, the encryption of the partition metadata portion of the system metadata is performed as follows. As mentioned above, the different types of system metadata includes partition metadata and log streams. As explained above in the description of the partition layer 114 (see description of FIGS. 6-10 above), partitions allow a level of scale out within each storage stamp 110. A partition is a collection of streams, prefixed with the partition name so that all streams have unique names. Each stream includes extents which hold data.

For each partition, the partition metadata is included in a "<partition name>.meta" stream. The partition metadata includes the following information: a list of all stream names for streams which the partition owns, key range information about the partition, schema (information about the type of data), pointers to the index and other data stored in streams, and pointers to transaction log replay information. The partition metadata is used by the partition servers 252 (see FIG. 9) to help load partitions (whether from Offload, Split, or Merge). All the partition metadata is batched together, compressed, and encrypted using a system encryption key.

Next, the encryption of the log streams is performed as follows. The write operations to blobs index or tables or queues first have their updates written/committed to a log. The write operations then get committed in memory to a memory table (e.g., see the memory table 310 shown in FIG. 10). In the background, the memory tables 310 are written to file tables. The file tables are disk representations of the memory tables. Each write operation results in a collection of log records, which include the following: Transaction metadata (ID, log epoch and sequence, Geo-replication metadata, etc.); the data record(s); and the commit record (indicating, for example, whether the write operation was aborted by the user, in which case there is no need to recreate the data by replaying the log in the event of a server crash before the write is acknowledged to the customer).

The transactions stored in the transaction log can belong to a single account or multiple accounts depending on the number of the accounts being served by the partition, which in turn is dependent on the load distribution of the partition keys. If the key range is receiving a lot of traffic, the partitions belonging to a single account are split into multiple partitions. Or if the traffic low, the partitions belonging to multiple accounts are coalesced (merged or combined) into a single partition. All the records in the update log (i.e., the replay log) are batched based on a size threshold and a time threshold and then compressed and encrypted. This provides capacity savings as the metadata has a relatively high compression ratio (e.g., up to 15%; i.e., 100 bytes get compressed to 15 bytes).

In contrast, if individual records belonging to different accounts' write requests were encrypted, the compressibility will be lost since each record size will be typically very small. Batching and then compressing and later encrypting all the records aggregated from different accounts using a single encryption key provide significant space savings. Encrypting each and every small write will also increase latencies. In contrast, batching data together and then encrypting reduces the latency overhead added by encryption.

Next, the encryption of the file table data (i.e., the system metadata portion including index for the four types of data when converting the memory tables to the file tables) is performed as follows. As mentioned above, the system metadata associated with storing the four types of data (i.e., the index for blobs (block blobs, page blobs, and append blobs), tables, queues, and files) is stored temporarily in the replay logs and memory tables for a short time. The file tables are the long-term form of the index. That is, the file tables store the system metadata as long as the data lives. Accordingly, the partition metadata also includes metadata associated with the file tables.

As explained above in the description of FIGS. 6-10, checkpoint is the process of turning memory tables into file tables. The checkpoint process is carried out as follows. First, the current memory table(s) are frozen, and a new memory table is created to accept further writes. Next, the frozen memory table(s) are converted into file table(s). Next, the active log regions are updated to truncate any information that is checkpointed since that information no longer needs to be replayed (the data is now secure in a file table).

The checkpoint process can be triggered based on a number of factors which include the following: the size of the log, the number of rows in the memory table, the total size of the memory table, and/or the time since the last checkpoint operation. While performing the checkpoint operation more frequently can reduce partition load time, frequently performing the checkpoint operation can degrades batching performance with later file table operations.

The encryption of the file table data (i.e., the system metadata including the index for the four types of data, and the tables and queues data) is performed during the checkpoint process which yields the highest advantage of packing as much data as possible and then compressing it. The batch size of the update log (i.e., the replay log) is relatively small because the system cannot acknowledge a write request until it is written to the log and waiting to compress and encrypt until there is sufficient batch size will increase the latency. Log stream batching (and encrypting after that) offers highest capacity savings for high ingress traffic. For low ingress traffic, while the system may not batch frequently, since there will be less data in the log streams and since the log streams are truncated anyway after checkpoint, the log streams do not take up a lot of disk space even if they are encrypted without much batching.

The file tables are created lazily (i.e., in background) without impacting user request latencies. Therefore, batching can be performed more frequently, followed by compression and encryption. Since the file table data is long term data, encrypting the file table data using frequent batching-compressing-encrypting process provides significantly high capacity savings and low latency overhead due to encryption as this process is performed in background. This process provides the capacity savings since the system metadata has a relatively high compression ratio (e.g., up to 15%; i.e., 100 bytes get compressed to 15 bytes).

During data read requests from the users, the system reads the batched writes, and decrypts and caches the data to serve future requests in that batch. Accordingly, the read requests have some latency overhead due to encryption.

The encryption of the tables and queues data is performed as explained above with reference to the file tables and is therefore omitted for brevity.

Next, the encryption of older unencrypted system metadata and associated data while performing garbage collection (defragmentation) is performed as follows. The encryption of file table data is performed not only during the file table creation (i.e., during checkpoint process) but encryption of older unencrypted index is also performed while performing garbage collection (defragmentation). The encryption of the older file table data during garbage collection is performed using age based garbage collection for selection of extents, for example. The encryption process of the file table data during garbage collection will also batch the unencrypted data (which was written when encryption was not supported), compress the batch, and then encrypt.

The encryption key used is the same key for each of the metadata types. Not using individual key for each account allows batching of metadata/data and then compressing and encrypting, which provides capacity savings. The encryption key for each of the metadata type is persisted in the system tables, which itself is encrypted using cluster wide encryption key, which can be rotated. Further, as explained above with reference to encryption of blobs, each encrypted metadata write is unique since the seed is randomly generated based on a system encryption key for specific metadata type and each block of data is encrypted using a respective key so that consecutive encrypted blocks appear random.

The encryption of the system metadata and the data for tables and queues is described below in further detail with reference to FIGS. 19-21. The encryption of the existing (i.e., older) unencrypted system metadata and the data for tables and queues during defragmentation is described below in further detail with reference to FIGS. 22-23. The encryption shown and described in these methods is performed in the partition layer 114 (see FIGS. 6-10).

Note that the systems and methods of the present disclosure can be implemented in any distributed storage system whether or not the distributed storage system includes the three layers shown as the front end layer 116, the partition layer 114, and the stream layer 112 (see FIG. 6). The teachings the present disclosure are equally applicable to an N-level distributed storage system, where N is an integer greater than or equal to 1.

Figure 19:
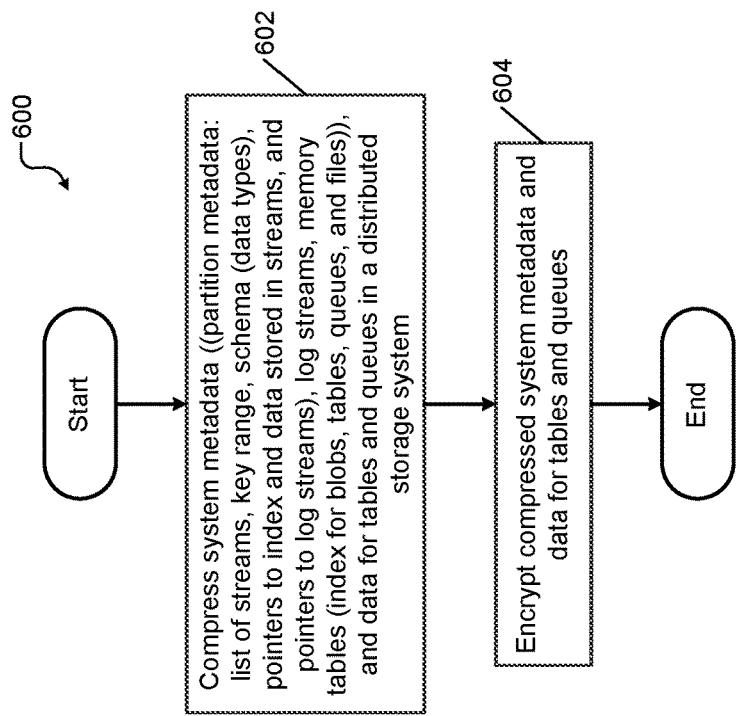

FIG. 19 shows a method 600 for encrypting the system metadata and the data for tables and queues in a distributed storage system such as the cloud storage system (CSS) 100. At 602, control compresses the system metadata including the partition metadata, the transaction or replay log streams, the memory tables, and the data for tables and queues. The partition metadata includes a list of all stream names, key range, schema (indicating types of data), pointers to index and other data stored in streams, and pointers to transaction log replay information. The transaction or replay log streams include transaction metadata, data records, and commit record. The memory tables include index for blobs, tables, queues, and files. At 604, control encrypts the compressed system metadata and the data for tables and queues as explained above and also below in further detail with reference to FIGS. 20 and 21.

Figure 20:
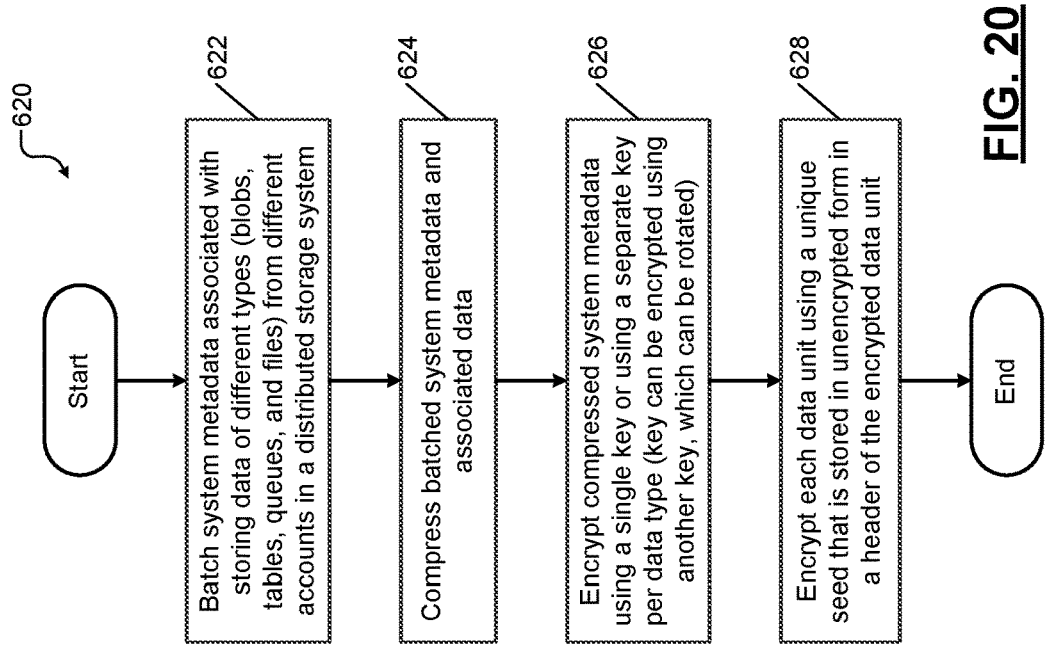
FIGS. 19-21 are flowcharts of methods for encrypting system metadata and data for tables and queues in a distributed storage system.

FIG. 20 shows a method 620 for encrypting the system metadata and the data for tables and queues in a distributed storage system such as the cloud storage system (CSS) 100. At 622, control batches the system metadata associated with storing data of different types (blobs, tables, queues, and files) from different accounts in a distributed storage system such as the CSS 100. At 624, control compresses the batched system metadata. At 626, control encrypts the compressed system metadata using a single key or using a separate key per data type. Regardless of whether a single key for all data types or a separate key per data type is used, the same key or keys is/are used for data from multiple accounts since the key(s) is/are internally generated and is/are transparent to users. Further, the key or keys can be encrypted using another key (e.g., the master stamp key described above), which can be rotated as previously described. At 628, control performs the encryption such that each encrypted data unit is generated using a separate (i.e., unique) seed that is randomly generated so that consecutive encrypted data units appear random as previously described. Further, the seed is stored in unencrypted form and is placed in a data header associated with the encrypted data unit as previously described.

Figure 21:
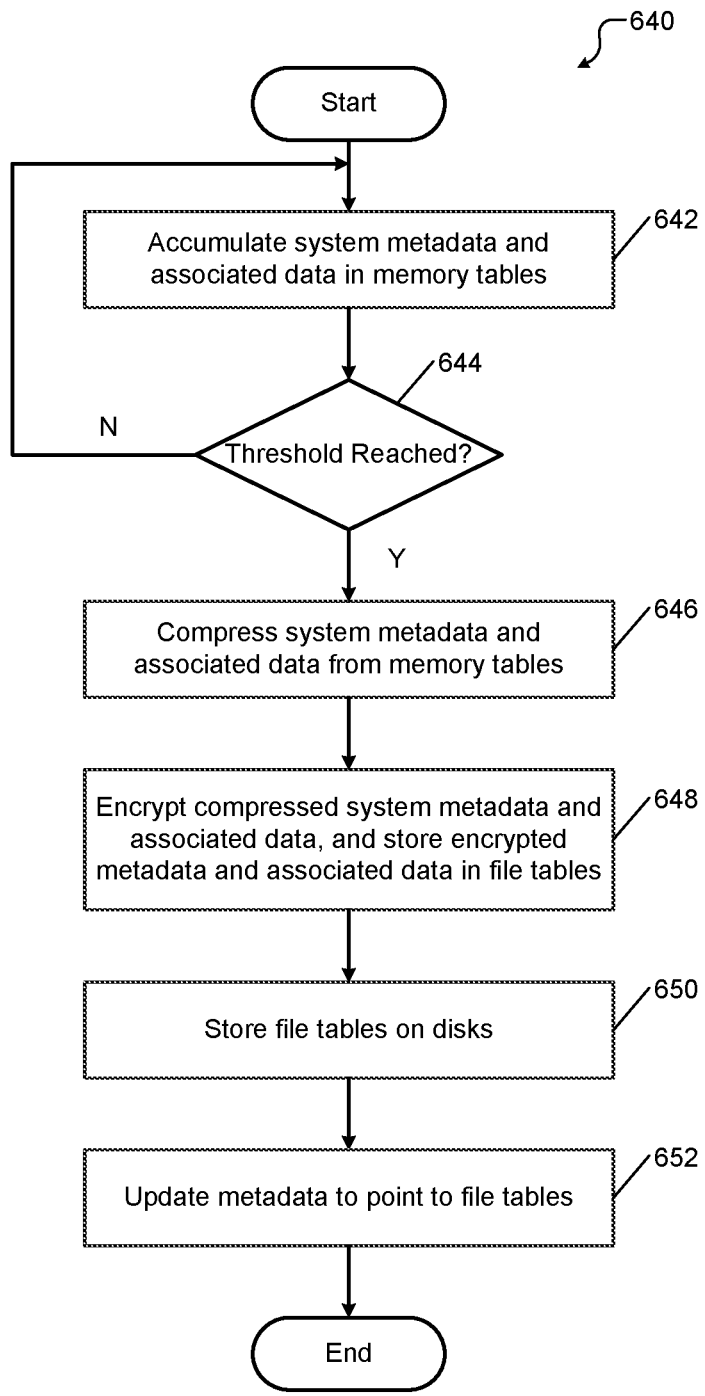

FIG. 21 shows a method 640 for encrypting the system metadata and the data for tables and queues in a distributed storage system such as the cloud storage system (CSS) 100. At 642, control collects or accumulates the system metadata and associated data stored in the memory tables. At 644, control determines whether to trigger (i.e., whether a threshold (e.g., a size based threshold, a time based threshold, and so on) is reached for performing) the checkpoint process of converting the memory tables into the file tables based on a number of factors including the size of the log in the memory tables, the number of rows in the memory table, the total size of the memory tables, and/or the time elapsed since last checkpoint operation. Control returns to 642 if the threshold is not yet reached. If the threshold is reached (i.e., if the checkpoint process is triggered based on the factors), control performs the checkpoint process as follows.

At 646, control compresses the system metadata and the associated data (i.e., compresses both the system metadata and the associated data) from the memory tables. At 648, control encrypts the compressed system metadata and associated data (i.e., encrypts both the compressed system metadata and the compressed associated data), and stores the encrypted metadata and associated data (i.e., both the encrypted compressed system metadata and the encrypted compressed associated data) in the file tables. Accordingly, at 646 and 648, control converts the memory tables into the file tables, and control compresses and encrypts the system metadata and the associated data during the conversion process (i.e., while generating the file tables based on the memory tables). At 650, control stores the file tables in one or more disks in the stream layer 112. At 652, control updates the system metadata to point to the file tables.

Figure 22:
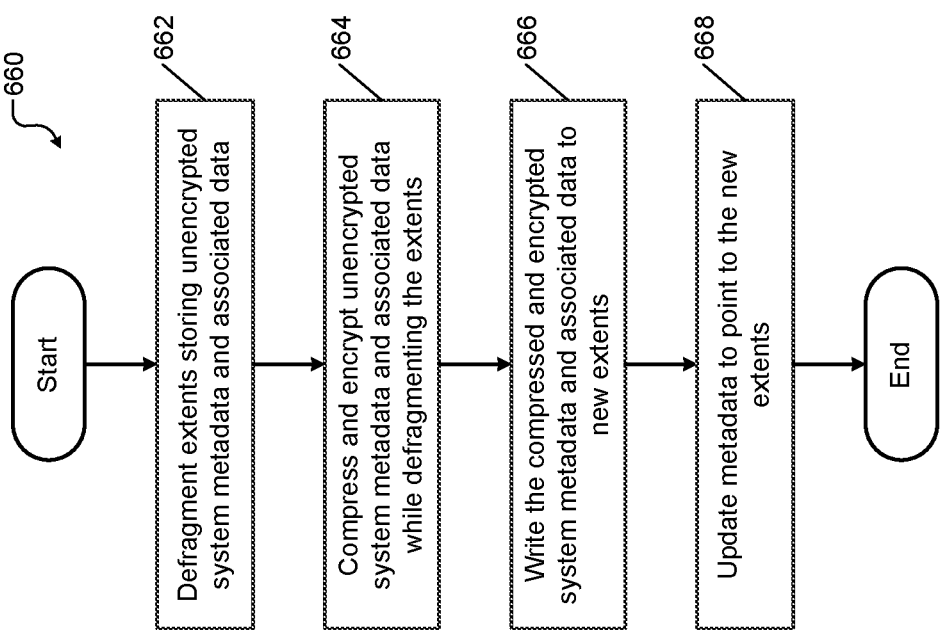

FIG. 22 shows a method 660 for encrypting the unencrypted system metadata and the associated data during garbage collection (defragmentation). The method 660 is described in further detail with reference to FIG. 23 below. At 662, control defragments extents storing the unencrypted system metadata and the associated data. At 664, control compresses and encrypts the unencrypted system metadata and the associated data (i.e., compresses and encrypts both the system metadata and the associated data) while defragmenting the extents. At 666, control writes the compressed and encrypted system metadata and the associated data (i.e., the compressed and encrypted system metadata and the compressed and encrypted associated data) to new extents. At 668, control updates the system metadata to point to the new extents.

Figure 23:
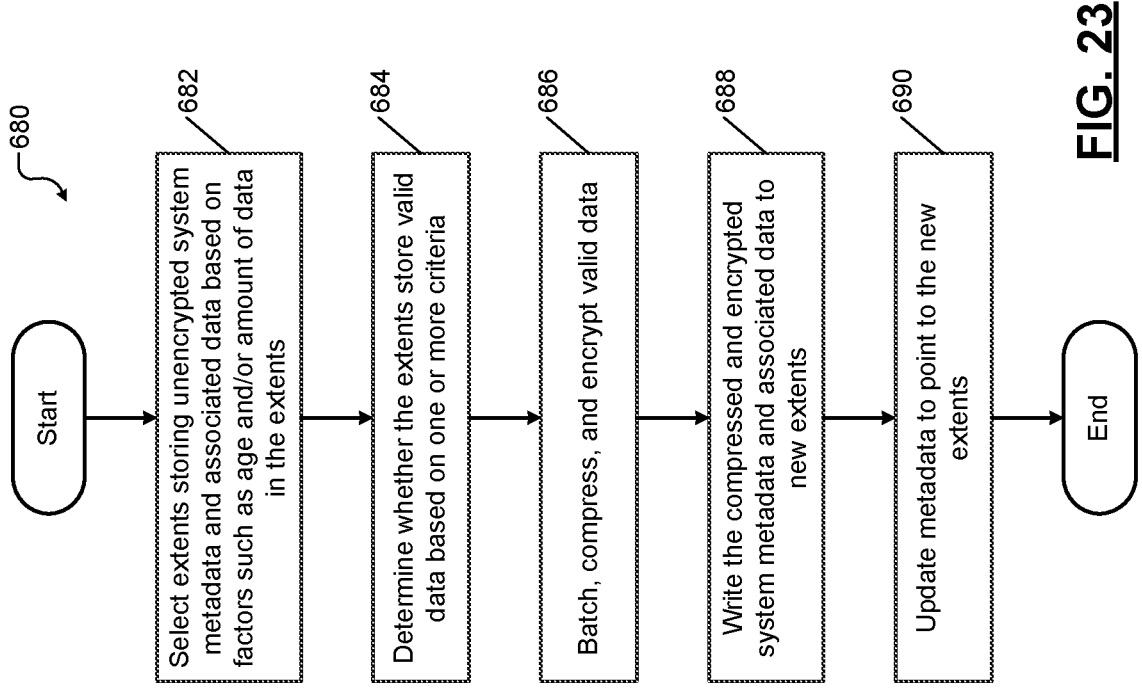
FIGS. 22 and 23 are flowcharts of methods for encrypting system metadata and associated data during garbage collection (defragmentation).

FIG. 23 shows a method 680 for encrypting the unencrypted system metadata and the associated data during garbage collection (defragmentation) in further detail. At 682, control selects the extents storing the unencrypted system metadata and the associated data based on factors such as age and/or amount of data in the extents. The criteria for triggering garbage collection and selecting extents for garbage collection are similar to the criteria described previously and are therefore not repeated for brevity. At 684, control determines whether the selected extents store valid data based on one or more criteria used to determine validity of data. For example, valid data is data that is not yet expired (i.e., data that is still in use), data that was not deleted earlier, and so on. At 686, control batches, compresses, and encrypts the valid data (i.e., batches, compresses, and encrypts both the valid system metadata and the associated data). At 688, control writes the compressed and encrypted system metadata and the associated data (i.e., the compressed and encrypted system metadata and the compressed and encrypted associated data) to new extents. At 690, control updates the system metadata to point to the new extents.

Below are simplistic examples of a distributed computing environment in which the systems and methods of the present disclosure can be implemented. Throughout the present disclosure, references to terms such as servers, client devices, applications, and so on are for illustrative purposes only. The terms servers and client devices are to be understood broadly as representing computing devices comprising one or more processors and memory configured to execute machine readable instructions. The terms applications and computer programs are to be understood broadly as representing machine readable instructions executable by the computing devices.

Figure 24:
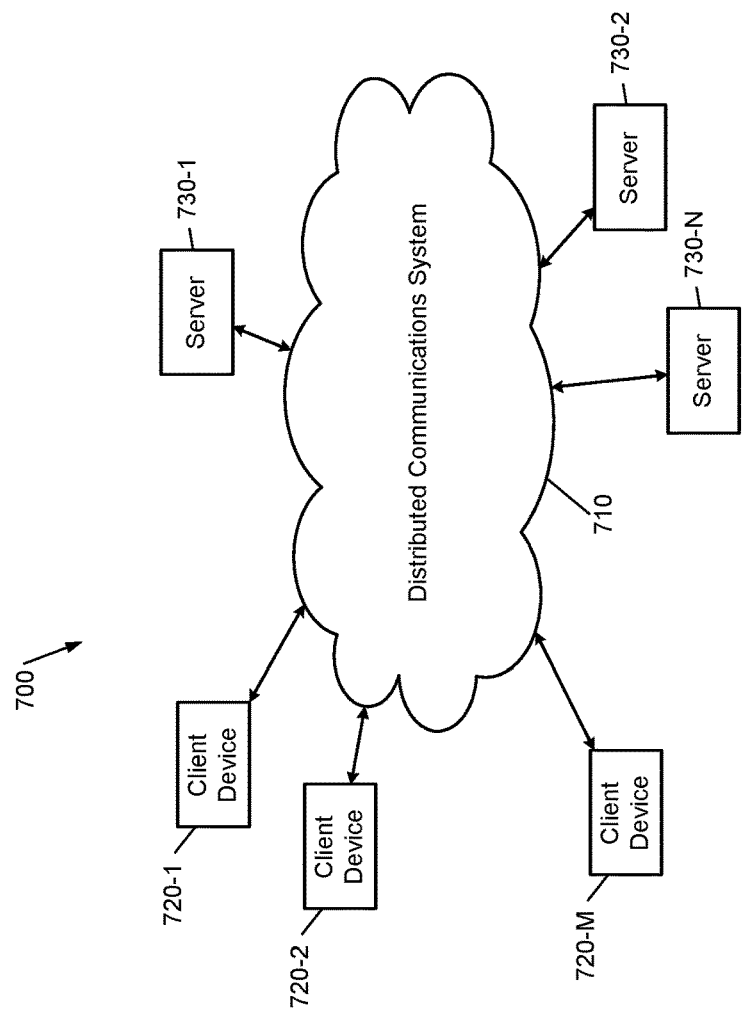
FIG. 24 is a functional block diagram of a simplified example of a distributed network system.

FIG. 24 shows a simplified example of a distributed network system 700. The distributed network system 700 includes a network 710 (e.g., a distributed communication system), one or more client devices 720-1, 720-2, . . . , and 720-M (collectively client devices 720); and one or more servers 730-1, 730-2, . . . , and 730-N (collectively servers 730); where M and N are an integers greater than or equal to one. The network 710 may include a local area network (LAN), a wide area network (WAN) such as the Internet, or other type of network (collectively shown as the network 710). The client devices 720 communicate with the servers 730 via the network 710. The client devices 720 and the servers 730 may connect to the network 710 using wireless and/or wired connections to the network 710.

The servers 730 and the client devices 720 may implement one or more components of the cloud computing system (CCS) 10 shown in FIGS. 3-5. For example, one server 730 may implement the cloud controller 12 or the compute resource provider 26 of the cloud controller 12 while one or more client devices 720 may implement the fabric controllers 32. Alternatively, one or more servers 730 may implement one or more components of the cloud controller 12. Many different configurations of implementations are contemplated.

Further, the servers 730 and the client devices 720 may implement one or more components of the cloud storage system (CSS) 100 shown in FIGS. 6-10. For example, the servers 730 may implement the servers in the front end layer 116, the partition servers 252 in the partition layer 114, and the extent nodes 202 in the stream layer 112. For example, in the stream layer 112, one server 730 may implement the stream manager 200 while one or more servers 730 or one or more client devices 720 may implement one or more extent nodes 202. For example, in the partition layer 114, one server 730 may implement the partition manager 250 while one or more servers 730 or one or more client devices 720 may implement one or more partition servers 252. Many different configurations of implementations are contemplated.

The servers 730 may provide multiple services to the client devices 720. For example, the servers 730 may execute a plurality of software applications. The servers 730 may host multiple databases that are utilized by the plurality of software applications and that are used by the client devices 720. In addition, the servers 730 and the client devices 720 may execute applications that implement the cloud storage system (CSS) 100 shown in FIGS. 6-10 and the methods 400-680 described above with reference to FIGS. 11-23.

Figure 25:
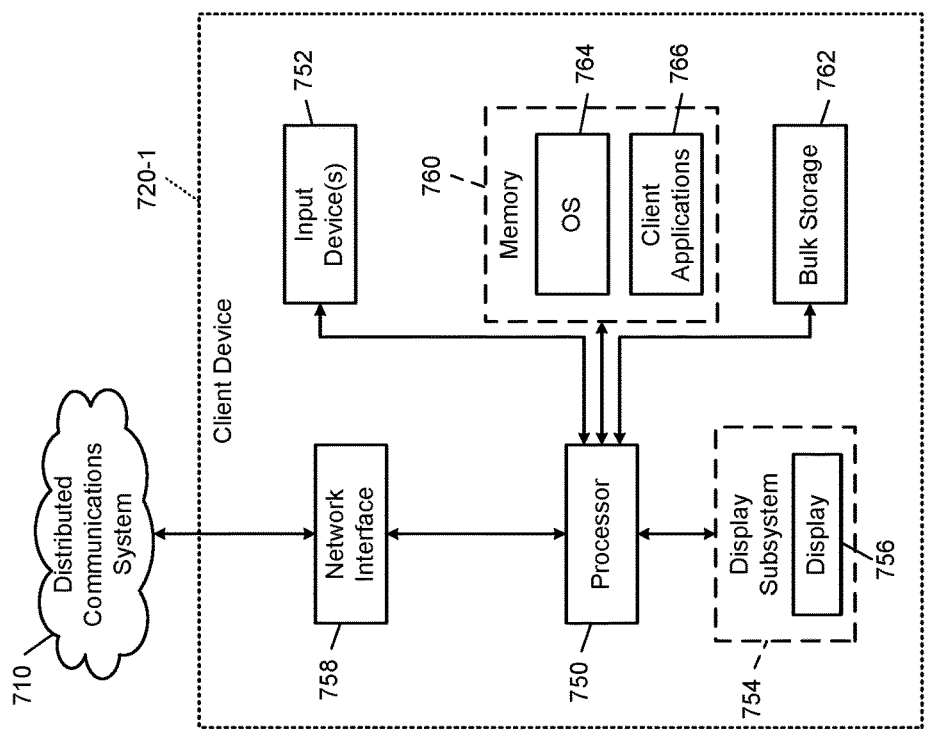
FIG. 25 is a functional block diagram of a simplified example of a client device used in the distributed network system of FIG. 24.

FIG. 25 shows a simplified example of the client devices 720 (e.g., the client device 720-1). The client device 720-1 may typically include a central processing unit (CPU) or processor 750, one or more input devices 752 (e.g., a keypad, touchpad, mouse, and so on), a display subsystem 754 including a display 756, a network interface 758, a memory 760, and a bulk storage 762.

The network interface 758 connects the client device 720-1 to the distributed network system 700 via the network 710. For example, the network interface 758 may include a wired interface (e.g., an Ethernet interface) and/or a wireless interface (e.g., a Wi-Fi, Bluetooth, near field communication (NFC), or other wireless interface). The memory 760 may include volatile or nonvolatile memory, cache, or other type of memory. The bulk storage 762 may include flash memory, a hard disk drive (HDD), or other bulk storage device.

The processor 750 of the client device 720-1 executes an operating system (OS) 764 and one or more client applications 766. The client applications 766 include an application to connect the client device 720-1 to the servers 730 via the network 710. The client device 720-1 accesses one or more applications executed by the servers 730 via the network 710. The client applications 766 may also include an application that implements the CSS 100 and the methods 400-680 described above.

Figure 26:
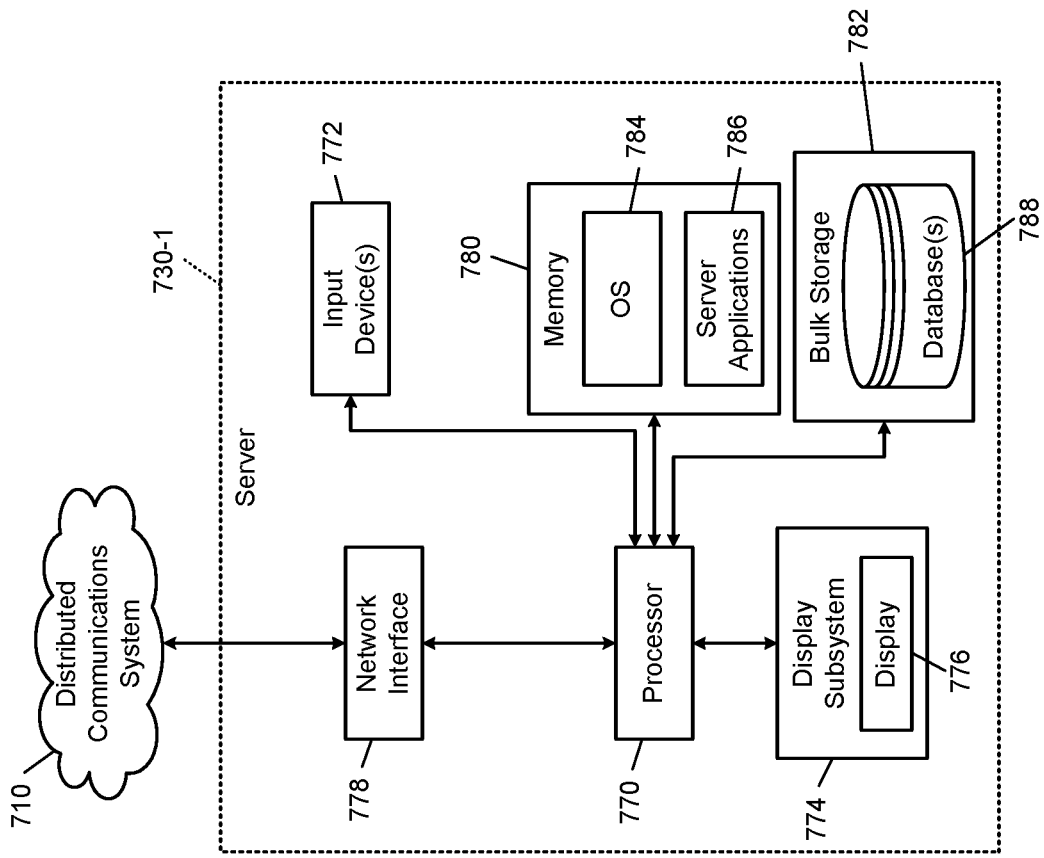
FIG. 26 is a functional block diagram of a simplified example of a server used in the distributed network system of FIG. 24.

FIG. 26 shows a simplified example of the servers 730 (e.g., the server 730-1). The server 730-1 typically includes one or more CPUs or processors 770, one or more input devices 772 (e.g., a keypad, touchpad, mouse, and so on), a display subsystem 774 including a display 776, a network interface 778, a memory 780, and a bulk storage 782.

The network interface 778 connects the server 730-1 to the distributed network system 700 via the network 710. For example, the network interface 778 may include a wired interface (e.g., an Ethernet interface) and/or a wireless interface (e.g., a Wi-Fi, Bluetooth, near field communication (NFC), or other wireless interface). The memory 780 may include volatile or nonvolatile memory, cache, or other type of memory. The bulk storage 782 may include flash memory, one or more hard disk drives (HDDs), or other bulk storage device.

The processor 770 of the server 730-1 executes an operating system (OS) 784 and one or more server applications 786. The server applications 786 may include an application that implements the CSS 100 and the methods 400-680 described above. The bulk storage 782 may store one or more databases 788 that store data structures used by the server applications 786 to perform respective functions.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

What is claimed is:

1. A distributed storage system implemented in a cloud computing system, the distributed storage system comprising:
   one or more processors; and
   a tangible machine readable storage medium storing machine readable instructions that, when executed by the one or more processors, configure the one or more processors to:
      receive requests to store data in the distributed storage system;
      authenticate and authorize the requests;
      generate system metadata for storing the data in the distributed storage system, the system metadata comprising data index information related to data storage locations;
      store the data at the data storage locations;
      after accumulating system metadata related to a plurality of data storage requests, batch the system metadata related to the plurality of data storage requests;
      compress the system metadata that was batched to form compressed system metadata;
      encrypt the compressed system metadata to form encrypted compressed system metadata; and
      store the encrypted compressed system metadata in the distributed storage system.

2. The distributed storage system of claim 1 wherein the machine readable instructions configure the processor to:
   compress at least a portion of the data to form a compressed portion of the data when compressing the system metadata;
   encrypt the compressed portion of the data to form an encrypted compressed portion of the data when encrypting the compressed system metadata; and
   store the encrypted compressed portion of the data with the encrypted compressed system metadata in the distributed storage system.

3. The distributed storage system of claim 1 wherein the data includes different types of data and wherein the system metadata includes different system metadata for each type of data.

4. The distributed storage system of claim 1 wherein the data is received at a first layer of servers, and wherein the data includes data from different sources having different identities that the first layer of servers is configured to authenticate and authorize.

5. The distributed storage system of claim 1 wherein the data includes different types of data from different sources having different identities, and wherein the machine readable instructions configure the processor to encrypt the system metadata generated for storing the data of the different types from the different sources using a single key.

6. The distributed storage system of claim 1 wherein the data includes different types of data from different sources having different identities, and wherein the machine readable instructions configure the processor to encrypt the system metadata generated for storing the data from the different sources using a separate key for each type of data.

7. The distributed storage system of claim 1 wherein the machine readable instructions configure the processor to encrypt each data unit of the compressed system metadata using a separate seed randomly generated for each data unit so that consecutive encrypted data units appear random.

8. The distributed storage system of claim 7 wherein the machine readable instructions configure the processor to store a seed used to encrypt a data unit of the compressed system metadata in unencrypted form in a header associated with the data unit encrypted and to use the seed stored in the header associated with the data unit encrypted when decrypting the data unit encrypted.

9. The distributed storage system of claim 1 wherein the machine readable instructions configure the processor to:
encrypt a first key used to encrypt the compressed system metadata using a second key associated with a cluster of servers; and
rotate the second key.

10. The distributed storage system of claim 1 wherein the machine readable instructions configure the processor to:
defragment data units storing unencrypted system metadata and associated data in the distributed storage system; and
compress and encrypt the unencrypted system metadata and associated data while defragmenting the data units.

11. The distributed storage system of claim 1 wherein the machine readable instructions configure the processor to:
select data units storing unencrypted system metadata and associated data in the distributed storage system based on at least one of an age and an amount of the unencrypted system metadata and associated data stored in the data units;
determine which of the data units selected include valid data based on a predetermined criterion, the valid data including valid unencrypted system metadata and associated data;
defragment the data units with valid data by writing the valid data from the data units to one or more new data units in the distributed storage system and by releasing the data units for storing new data;
compress and encrypt the valid data when writing the valid data to the one or more new data units; and
update the system metadata to point to the one or more new data units.

12. A method comprising:
accumulating, in first data structures in a first storage medium in a distributed storage system, data and system metadata generated for storing the data in the distributed storage system, the data received from a plurality of sources having distinct identities, and the data being of different types;
converting the first data structures, after a predetermined criterion is satisfied, into second data structures for storing in a second storage medium in the distributed storage system;
compressing and encrypting the data when converting the first data structures into the second data structures;
batching accumulated system metadata, and compressing and encrypting the accumulated system metadata to form compressed and encrypted system metadata; and
storing the second data structures including compressed and encrypted system metadata and data in the second storage medium in the distributed storage system.

13. The method of claim 12, wherein:
encrypting the system metadata generated for storing the data of the different types from the plurality of sources comprises using a single key; or
encrypting the system metadata generated for storing the data from the plurality of sources comprises using a separate key for each type of data.

14. The method of claim 12 further comprising:
encrypting each data unit of compressed system metadata using a separate seed randomly generated for each data unit so that consecutive encrypted data units appear random;
storing a seed used to encrypt a data unit of the compressed system metadata in unencrypted form in a header associated with the data unit encrypted; and
using the seed stored in the header associated with the data unit encrypted when decrypting the data unit encrypted.

15. The method of claim 12 further comprising:
defragmenting data units storing unencrypted system metadata and associated data in the distributed storage system; and
compressing and encrypting the unencrypted system metadata and associated data while defragmenting the data units.

16. A distributed storage system comprising:
one or more processors; and
a tangible machine readable medium storing machine readable instructions that are executable by the one or more processors to:
receive data of one or more types from one or more sources having distinct identities for storing the data in a distributed storage system;
generate system metadata for storing the data in the distributed storage system;
store the system metadata generated for storing the data in data structures in the distributed storage system;
select a portion of the system metadata generated for storing the data in the distributed storage system;
batch the portion of the system metadata selected;
compress the portion of the system metadata that was batched to form compressed system metadata;
encrypt the compressed system metadata using a single key or using a separate key for each data type to form encrypted compressed system metadata; and
store the encrypted compressed system metadata in the distributed storage system.

* * * * *